US009082001B2

(12) United States Patent
Muninder et al.

(10) Patent No.: US 9,082,001 B2
(45) Date of Patent: Jul. 14, 2015

(54) METHOD, APPARATUS AND COMPUTER PROGRAM PRODUCT FOR TRACKING FACE PORTION

(75) Inventors: Veldandi Muninder, Bangalore (IN); Pranav Mishra, Bangalore (IN); Changyeon Jo, San Jose, CA (US); Krishna Govindarao, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 168 days.

(21) Appl. No.: 13/806,705

(22) PCT Filed: Jun. 7, 2011

(86) PCT No.: PCT/FI2011/050528
§ 371 (c)(1),
(2), (4) Date: May 14, 2013

(87) PCT Pub. No.: WO2011/161307
PCT Pub. Date: Dec. 29, 2011

(65) Prior Publication Data
US 2013/0230240 A1    Sep. 5, 2013

(30) Foreign Application Priority Data
Jun. 23, 2010   (IN) .............................. 1769/CHE/2010

(51) Int. Cl.
*G06K 9/00* (2006.01)
*G06T 7/20* (2006.01)

(52) U.S. Cl.
CPC .............. *G06K 9/00234* (2013.01); *G06T 7/20* (2013.01); *G06T 2207/10016* (2013.01); *G06T 2207/10024* (2013.01); *G06T 2207/30201* (2013.01); *G06T 2207/30241* (2013.01)

(58) Field of Classification Search
CPC .......... G06K 9/00234; G06K 9/00228; G06T 2207/30201; G06T 2207/10016; G06T 2207/10024
USPC .......................... 382/103, 118, 165, 168, 224
See application file for complete search history.

(56) References Cited

U.S. PATENT DOCUMENTS

| 7,580,054 | B2 * | 8/2009 | Rui et al. .................... 348/14.05 |
| 7,916,897 | B2 * | 3/2011 | Corcoran et al. ............. 382/103 |
| 8,331,614 | B2 * | 12/2012 | Mannerheim et al. ........ 382/103 |
| 2004/0220769 | A1 | 11/2004 | Rui et al. |
| 2008/0137957 | A1 | 6/2008 | Xu et al. |
| 2009/0003342 | A1 | 1/2009 | Dickens et al. |

FOREIGN PATENT DOCUMENTS

CN            1794264 A      6/2006

OTHER PUBLICATIONS

International Search Report for Application No. PCT/FI2011/050528, dated Sep. 21, 2011.

(Continued)

*Primary Examiner* — Kanjibhai Patel
(74) *Attorney, Agent, or Firm* — Alston & Bird LLP

(57) ABSTRACT

Method, apparatus, and computer program product are provided. The method includes detecting a face portion in a frame of a plurality of frames of a multi-media content. The method further includes tracking the face portion in at least one subsequent frame of the frame. A color-tracking of the face portion is performed on losing a track of the face portion in the at least one subsequent frame. The color-tracking is performed for re-tracking the face portion in the at least one subsequent frame.

14 Claims, 10 Drawing Sheets

(56) References Cited

OTHER PUBLICATIONS

Lu, Y., et al., *Face Tracking in Video Sequences using Particle Filter Based on Skin Color Model and Facial Contour*, Second International Symposium on Intelligent Information Technology Application (IITA '08) (2008) pp. 457-461.

International Preliminary Report on Patentability/Written Opinion for Application No. PCT/FI2011/050528 dated Dec. 28, 2012.
Office Action from Chinese Patent Application No. 20118000401904 dated Feb. 3, 2015.

* cited by examiner

METHOD, APPARATUS AND COMPUTER PROGRAM PRODUCT FOR TRACKING FACE PORTION

TECHNICAL FIELD

Various implementations generally relate to methods, apparatuses and computer program products for tracking face portion.

BACKGROUND

Processing of images is increasingly gaining use in applications such as video editing, video compression, security and surveillance, human computer interaction and the like. The processing of images typically involves detecting a face in a sequence of image frames and/or video frames, and, then subsequently tracking the face in subsequent images.

Face detection is commonly performed using a pattern recognition based detector which is a computationally intensive task in order to be used for every frame. On detecting a face, tracking of the face is performed. The tracking of the face requires that the face is not missed in any of the following frames, implying that the tracking of the face must be robust.

However, the tracking of the face may not be robust, as the performance may be limited by an accuracy of the pattern recognition based detector. This may lead to missing some faces in-between frames. On losing track of the face, a detection of the face may be performed again for detecting the face and subsequently tracking the face. As a result, the computationally intensive pattern recognition based detector may need to be utilized again, thereby resulting in increased number of computations per frame.

SUMMARY OF VARIOUS EMBODIMENTS

Methods, apparatuses, and computer program products for face portion tracking are provided.

In one aspect, a method is provided. The method includes detecting a face portion in a frame of a plurality of frames of a multimedia content. The method further includes tracking the face portion in at least one subsequent frame of the frame. A color-tracking of the face portion is performed on losing a track of the face portion in the at least one subsequent frame. The color-tracking is performed for re-tracking the face portion in the at least one subsequent frame.

In an embodiment, detecting the face portion in the frame comprises providing a detection window configured to overlay onto a set of pixels in the frame. Thereafter, the set of pixels bounded by the detection window are evaluated based on at least one layer of classification function for detecting the face portion in the set of pixels. The detection window is traversed by a first step size onto a neighboring set of pixels of the set of pixels. The neighboring set of pixels are evaluated based on the at least one layer of classification function for detecting the face portion in the neighboring set of pixels.

In an embodiment, a starting point of the detection window is shifted by a pre-defined size in successive frames of the plurality of frames for detecting the face portion. In an embodiment, evaluating the set of pixels bounded by the detection window comprises evaluating the set of pixels based on a first layer of classification function of the at least one layer of classification function. The evaluation is configured to be performed for one or more angles of orientation and is further configured to compute classification score for at least one of the one or more angles of orientation. An angle with a maximum score of computed classification scores is selected as an angle of orientation of the face portion. The face portion is detected in the set of pixels by performing evaluation of the set of pixels based on the at least one layer of classification function, where the evaluation is configured to be performed for the angle of orientation of the face portion.

In an embodiment, the detection of the face portion is performed in the frame for one or more scales of a plurality of scales and a number of scales of the plurality of scales over which the detection of the face portion is performed is divided across the plurality of frames, where the plurality of scales represents a plurality of sizes of the face portion. In an embodiment, at least one of a skin filter and a texture filter is applied for removing non face portions from the frame. The texture filter may be based on a local binary pattern in the frame. In an embodiment, detecting the face portion is based on a pattern recognition in the frame.

In an embodiment, tracking of the face portion comprises detecting the face portion in a region of interest in a subsequent frame of the at least one subsequent frame, where the region of interest corresponds to a region in the frame in which the face portion is detected. Further, tracking of the face portion may be configured to be performed for a select number of scales of a plurality of scales, where the select number of scales may be chosen based on a scale for which the face portion is detected in the frame. In an embodiment, the region of interest is disabled on detection of the face portion for precluding further tracking of the face portion in the region of interest.

In an embodiment, the color-tracking is performed based on at least one of a luminance projection distance and a color histogram distance. In an embodiment, the color-tracking comprises computing a horizontal luminance projection, a vertical luminance projection and a color histogram for each test detection window of a plurality of test detection windows in a region of interest in a subsequent frame of the at least one subsequent frame, where the region of interest corresponds to a region in the frame in which the face portion is detected. The luminance projection distance for the each test detection window is computed based on the horizontal luminance projection and the vertical luminance projection for the each test detection window and a reference horizontal luminance projection and a reference vertical luminance projection. The color histogram distance for the each test detection window is computed based on the color histogram for the each test detection window and a reference color histogram. Further, a presence of the face portion is determined in the region of interest based on the luminance projection distance and the color histogram distance for the each test detection window.

In an embodiment, the luminance projection distance for the each test detection window is computed based on a difference between the reference horizontal luminance projection and the computed horizontal luminance projection for the each test detection window, and a difference between the reference vertical luminance projection and the computed vertical luminance projection for the each test detection window. Further, the color histogram distance for the each test detection window is computed based on a difference between the reference color histogram and the computed color histogram for the each test detection window.

In an embodiment, the face portion is determined to be present if a minimum value of the luminance projection distance is lower than a first threshold value and the color histogram distance is lower than a second threshold value. Further, the face portion may be determined to be present if the minimum value of the luminance projection distance is between the first threshold value and a third threshold value and a minimum value of the color histogram distance is lower than a fourth threshold value. Furthermore, the face portion may be determined to be absent if the minimum value of the luminance projection distance is greater than the third threshold value.

In an embodiment, the color-tracking is performed upon losing track of the face portion and upon tracking the face portion for a pre-defined number of successive frames of the at least one subsequent frame. In an embodiment, the reference color histogram is computed for one or more regions of interest in which face portion is tracked upon tracking the face portion for a pre-defined number of successive frames of the at least one subsequent frame.

In another aspect, an apparatus is provided. The apparatus includes at least one processor, and at least one memory comprising computer program code. The at least one memory and the computer program code configured to, with the at least one processor, cause the apparatus at least to detect a face portion in a frame of a plurality of frames of a multimedia content. The apparatus is further caused to track face portion in at least one subsequent frame of the frame. The apparatus is further caused to perform a color-tracking of the face portion on losing a track of the face portion in the at least one subsequent frame. The color-tracking is performed for re-tracking the face portion in the at least one subsequent frame.

In an embodiment, the apparatus is further caused, at least in part, to detect the face portion in the frame by providing a detection window configured to overlay onto a set of pixels in the frame. The set of pixels bounded by the detection window is evaluated based on at least one layer of classification function for detecting the face portion in the set of pixels. Further, the detection window is traversed by a first step size onto a neighboring set of pixels of the set of pixels. The neighboring set of pixels are evaluated based on the at least one layer of classification function for detecting the face portion in the neighboring set of pixels.

In an embodiment, the apparatus is further caused, at least in part, to shift a starting point of the detection window by a pre-defined size in successive frames of the plurality of frames for detecting the face portion. In an embodiment, the apparatus is further caused, at least in part, to evaluate the set of pixels bounded by the detection window by evaluating the set of pixels based on a first layer of classification function of the at least one layer of classification function. The evaluation is configured to be performed for one or more angles of orientation and is further configured to compute classification score for at least one of the one or more angles of orientation. Further, an angle with a maximum score of computed classification scores is selected as an angle of orientation of the face portion. The face portion is detected in the set of pixels by performing evaluation of the set of pixels based on the at least one layer of classification function, where the evaluation is configured to be performed for the angle of orientation of the face portion.

In an embodiment, the apparatus is further caused, at least in part, to configure detecting the face portion in the frame to be performed in the frame for one or more scales of a plurality of scales and a number of scales of the plurality of scales over which the detection of the face portion is performed is divided across the plurality of frames, where the plurality of scales represents a plurality of sizes of the face portion. In an embodiment, the apparatus is further caused, at least in part, to apply at least one of a skin filter and a texture filter for removing non face portions from the frame. The texture filter may be based on a local binary pattern in the frame. In an embodiment, the apparatus is further caused, at least in part, to detect the face portion based on a pattern recognition in the frame.

In an embodiment, the apparatus is further caused, at least in part, to perform tracking of the face portion by detecting the face portion in a region of interest in a subsequent frame of the at least one subsequent frame, where the region of interest corresponds to a region in the frame in which the face portion is detected. In an embodiment, the apparatus is further caused, at least in part, to configure tracking of the face portion to be performed for a select number of scales of a plurality of scales, the select number of scales may be chosen based on a scale for which the face portion is detected in the frame. Further, the region of interest may be disabled on detection of the face portion for precluding further tracking of the face portion in the region of interest.

In an embodiment, the apparatus is further caused, at least in part, to perform the color-tracking based on at least one of a luminance projection distance and a color histogram distance. In an embodiment, the apparatus is further caused, at least in part, to perform the color-tracking by computing a horizontal luminance projection, a vertical luminance projection and a color histogram for each test detection window of a plurality of test detection windows in a region of interest in a subsequent frame of the at least one subsequent frame, the region of interest corresponding to a region in the frame in which the face portion is detected. A luminance projection distance for the each test detection window may be computed based on the horizontal luminance projection and the vertical luminance projection for the each test detection window and a reference horizontal luminance projection and a reference vertical luminance projection. A color histogram distance for the each test detection window may be computed based on the color histogram for the each test detection window and a reference color histogram. A presence of the face portion in the region of interest may be determined based on the luminance projection distance and the color histogram distance for the each test detection window.

In an embodiment, the apparatus is further caused, at least in part, to compute the luminance projection distance for the each test detection window based on a difference between the reference horizontal luminance projection and the computed horizontal luminance projection for the each test detection window, and a difference between the reference vertical luminance projection and the computed vertical luminance projection for the each test detection window. In an embodiment, the apparatus is further caused, at least in part, to compute the color histogram distance for the each test detection window based on a difference between the reference color histogram and the computed color histogram for the each test detection window.

In an embodiment, the apparatus is further caused, at least in part, to determine the face portion to be present if a minimum value of the luminance projection distance is lower than a first threshold value and the color histogram distance is lower than a second threshold value. Further, the face portion may be determined to be present if the minimum value of the luminance projection distance is between the first threshold value and a third threshold value and a minimum value of the color histogram distance is lower than a fourth threshold value. Furthermore, the face portion may be determined is absent if the minimum value of the luminance projection distance is greater than the third threshold value.

In an embodiment, the apparatus is further caused, at least in part, to perform the color-tracking upon losing track of the face portion and upon tracking the face portion for a pre-defined number of successive frames of the at least one subsequent frame. In an embodiment, the apparatus is further caused, at least in part, to compute the reference color histogram for one or more regions of interest in which face portion is tracked upon tracking the face portion for a pre-defined number of successive frames of the at least one subsequent frame.

In yet another aspect, a computer program product is provided. The computer program product includes at least one computer-readable storage medium, the computer-readable storage medium includes a set of instructions, which, when executed by one or more processors, cause an apparatus to at least perform to detect a face portion in a frame of a plurality of frames of a multimedia content. The face portion is tracked in at least one subsequent frame of the frame. A color-tracking of the face portion is performed on losing a track of the face portion in the at least one subsequent frame. The color-tracking is performed for re-tracking the face portion in the at least one subsequent frame.

In an embodiment, the apparatus is further caused, at least in part, to detect the face portion in the frame by providing a detection window configured to overlay onto a set of pixels in the frame. The set of pixels bounded by the detection window is evaluated based on at least one layer of classification function for detecting the face portion in the set of pixels. Further, the detection window is traversed by a first step size onto a neighboring set of pixels of the set of pixels. The neighboring set of pixels are evaluated based on the at least one layer of classification function for detecting the face portion in the neighboring set of pixels.

In an embodiment, the apparatus is further caused, at least in part, to shift a starting point of the detection window by a pre-defined size in successive frames of the plurality of frames for detecting the face portion. In an embodiment, the apparatus is further caused, at least in part, to evaluate the set of pixels bounded by the detection window by evaluating the set of pixels based on a first layer of classification function of the at least one layer of classification function. The evaluation is configured to be performed for one or more angles of orientation and further is configured to compute classification score for at least one of the one or more angles of orientation. Further, an angle with a maximum score of computed classification scores is selected as an angle of orientation of the face portion. The face portion is detected in the set of pixels by performing evaluation of the set of pixels based on the at least one layer of classification function, where the evaluation is configured to be performed for the angle of orientation of the face portion.

In an embodiment, the apparatus is further caused, at least in part, to configure detecting the face portion in the frame to be performed in the frame for one or more scales of a plurality of scales and a number of scales of the plurality of scales over which the detection of the face portion is performed is divided across the plurality of frames, where the plurality of scales represents a plurality of sizes of the face portion. In an embodiment, the apparatus is further caused, at least in part, to apply at least one of a skin filter and a texture filter for removing non face portions from the frame. The texture filter may be based on a local binary pattern in the frame. In an embodiment, the apparatus is further caused, at least in part, to detect the face portion based on a pattern recognition in the frame.

In an embodiment, the apparatus is further caused, at least in part, to perform tracking of the face portion by detecting the face portion in a region of interest in a subsequent frame of the at least one subsequent frame, where the region of interest corresponds to a region in the frame in which the face portion is detected. In an embodiment, the apparatus is further caused, at least in part, to configure tracking of the face portion to be performed for a select number of scales of a plurality of scales, the select number of scales may be chosen based on a scale for which the face portion is detected in the frame. Further, the region of interest may be disabled on detection of the face portion for precluding further tracking of the face portion in the region of the interest.

In an embodiment, the apparatus is further caused, at least in part, to perform the color-tracking based on at least one of a luminance projection distance and a color histogram distance. In an embodiment, the apparatus is further caused, at least in part, to perform the color-tracking by computing a horizontal luminance projection, a vertical luminance projection and a color histogram for each test detection window of a plurality of test detection windows in a region of interest in a subsequent frame of the at least one subsequent frame, the region of interest corresponding to a region in the frame in which the face portion is detected. A luminance projection distance for the each test detection window may be computed based on the horizontal luminance projection and the vertical luminance projection for the each test detection window and a reference horizontal luminance projection and a reference vertical luminance projection. A color histogram distance for the each test detection window may be computed based on the color histogram for the each test detection window and a reference color histogram. A presence of the face portion in the region of interest may be determined based on the luminance projection distance and the color histogram distance for the each test detection window.

In an embodiment, the apparatus is further caused, at least in part, to compute the luminance projection distance for the each test detection window based on a difference between the reference horizontal luminance projection and the computed horizontal luminance projection for the each test detection window, and a difference between the reference vertical luminance projection and the computed vertical luminance projection for the each test detection window. In an embodiment, the apparatus is further caused, at least in part, to compute the color histogram distance based on a difference between the reference color histogram and the computed color histogram for the each test detection window.

In an embodiment, the apparatus is further caused, at least in part, to determine the face portion to be present if a minimum value of the luminance projection distance is lower than a first threshold value and the color histogram distance is lower than a second threshold value. Further, the face portion may be determined to be present if the minimum value of the luminance projection distance is between the first threshold value and a third threshold value and a minimum value of the color histogram distance is lower than a fourth threshold value. Furthermore, the face portion may be determined is absent if the minimum value of the luminance projection distance is greater than the third threshold value.

In an embodiment, the apparatus is further caused, at least in part, to perform the color-tracking upon losing track of the face portion and upon tracking the face portion for a pre-defined number of successive frames of the at least one subsequent frame. In an embodiment, the apparatus is further caused, at least in part, to compute the reference color histogram for one or more regions of interest in which face portion is tracked upon tracking the face portion for a pre-defined number of successive frames of the at least one subsequent frame.

In still another aspect, a method is provided. The method includes detecting a face portion in a frame of a plurality of frames of a multimedia content. The method further includes tracking the face portion in at least one subsequent frame of the frame. Thereafter a color-tracking of the face portion is performed on losing a track of the face portion in the at least one subsequent frame. The color-tracking is performed for re-tracking the face portion in the at least one subsequent frame. The color-tracking is performed by computing a horizontal luminance projection, a vertical luminance projection and a color histogram for each test detection window of a plurality of test detection windows in a region of interest in a subsequent frame of the at least one subsequent frame, where the region of interest corresponds to a region in the frame in which the face portion is detected. The luminance projection distance for the each test detection window is computed based on the horizontal luminance projection and the vertical luminance projection for the each test detection window and a reference horizontal luminance projection and a reference vertical luminance projection. The color histogram distance for the each test detection window is computed based on the color histogram for the each test detection window and a reference color histogram. Further, a presence of the face portion is determined in the region of interest based on the luminance projection distance and the color histogram distance for the each test detection window.

In an embodiment, the luminance projection distance for the each test detection window is computed based on a difference between the reference horizontal luminance projection and the computed horizontal luminance projection for the each test detection window, and a difference between the reference vertical luminance projection and the computed vertical luminance projection for the each test detection window. Further, the color histogram distance for the each test detection window is computed based on a difference between the reference color histogram and the computed color histogram for the each test detection window.

In an embodiment, the face portion is determined to be present if a minimum value of the luminance projection distance is lower than a first threshold value and the color histogram distance is lower than a second threshold value. Further, the face portion may be determined to be present if the minimum value of the luminance projection distance is between the first threshold value and a third threshold value and a minimum value of the color histogram distance is lower than a fourth threshold value. Furthermore, the face portion may be determined to be absent if the minimum value of the luminance projection distance is greater than the third threshold value.

In still another aspect, an apparatus is provided. The apparatus includes means for detecting a face portion in a frame of a plurality of frames of a multimedia content. Further, the apparatus includes means for tracking the face portion in at least one subsequent frame of the frame. Furthermore, the apparatus includes means for performing a color-tracking of the face portion on losing a track of the face portion in the at least one subsequent frame. The color-tracking is performed for re-tracking the face portion in the at least one subsequent frame.

In yet another aspect, a computer program is provided. The computer program comprises a set of instructions, which, when executed by an apparatus, cause the apparatus to at least perform detection of a face portion in a frame of a plurality of frames of a multimedia content. The apparatus if further caused, to least, track the face portion in at least one subsequent frame of the frame. A color-tracking of the face portion is performed on losing a track of the face portion in the at least one subsequent frame. The color-tracking is performed for re-tracking the face portion in the at least one subsequent frame.

BRIEF DESCRIPTION OF THE DRAWINGS

The above-mentioned and other features and effects of this present disclosure, and the manner of attaining them, will become more apparent and the present disclosure will be better understood by reference to the following description of embodiments of the present disclosure taken in conjunction with the accompanying drawings, wherein.

DETAILED DESCRIPTION

Figure 1:
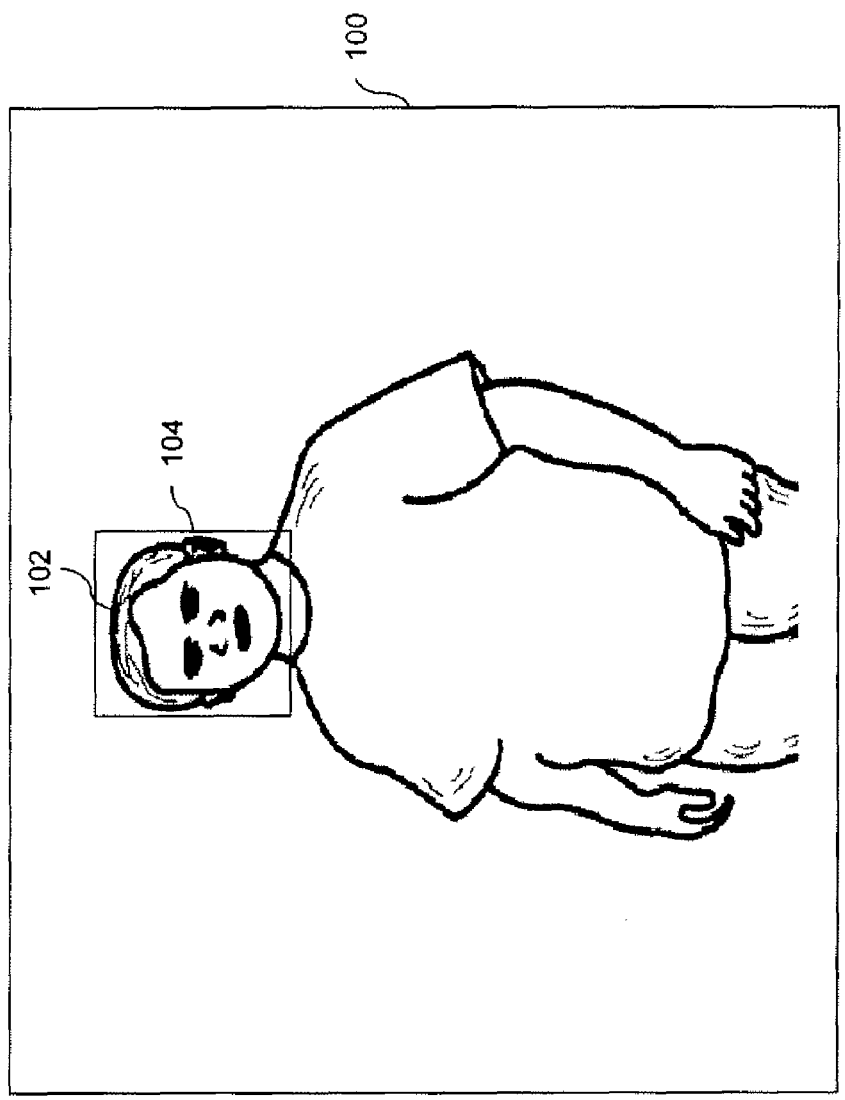
FIG. 1 is a schematic diagram of a frame illustrating a face portion, in accordance with an embodiment.

Methods, apparatuses and computer program products are provided for tracking a face portion in frames. The methods, apparatuses and computer program products facilitate reduction in a number of computations while detecting the face portion. Once the detection is complete, robust real time tracking of the face portion ensures that the face portion is not missed. Moreover, robust tracking of the face portion is achieved using fewer computations.

As described herein, an apparatus may be utilized for capturing and/or processing a multimedia content, such as image frames or video frames. Examples of such apparatus include, but are not limited to, digital camera, camcorder, any type of mobile terminal, fixed terminal, or portable terminal including a mobile handset, multimedia computer, multimedia tablet, Internet node, communicator, desktop computer, laptop computer, personal digital assistants (PDAs), audio and/or video player, electronic book device, game device, or any combination thereof. The processing of the multimedia content may at least partially include detecting an object, such as a face portion, in an image frame and further tracking the object in subsequent image frames. Tracking objects in image frames may have applications in video editing, video compression, security and surveillance, human computer interaction and the like.

In an embodiment, capturing of the multimedia content by the apparatus may be performed at relatively high rates, such as 30 frames per second. Accordingly, detecting objects and subsequently tracking the objects in the frame in real time may be computationally intensive and a complex operation. An object may be missed during a tracking operation causing the computationally intensive object detection operation to be re-performed. A robust tracking of the objects may be needed to be performed for ensuring that objects are not missed during the tracking operation.

As described herein, an object such as a face portion may be detected in a frame of a plurality of frames of a multimedia content. The detected face portion may be tracked in at least one subsequent frame. A color-tracking of the face portion may be performed on losing a track of the face portion for re-tracking the face portion, thereby ensuring robust tracking operation. The term 'frame' as used herein may refer to image frames and/or video frames included in the apparatus. Further, the term 'face portion' as used herein may refer to a face of a human being, a face of an animal or a substantive portion of an object captured either completely or partially in a frame by the apparatus. Moreover, the term 'color-tracking' as used herein refers to tracking operation performed using luma and color values and as such may be different from tracking operation performed using pattern recognition. The color-tracking may be used when pattern recognition based tracking misses an object, such as a face portion, and the object may be needed to be re-tracked. As described herein, 'color-tracking' refers to tracking using features such as luminance and color, and the term 'tracking' used otherwise may refer to an overall keeping a track of the face portion in frames or performing tracking based on pattern recognition.

Methods, apparatuses and computer program products are described in detail in FIGS. 1 through 9.

FIG. 1 is a schematic diagram of a frame illustrating a face portion, in accordance with an embodiment. The frame 100 may be a part of, for example, a multimedia content in an apparatus. The multimedia content may include a plurality of frames, such as the frame 100. An example of the multimedia content may be a video frame sequence or an image frame sequence. Examples of the apparatus include, but are not limited to, digital camera, camcorder, any type of mobile terminal, fixed terminal, or portable terminal including a mobile handset, multimedia computer, multimedia tablet, Internet node, communicator, desktop computer, laptop computer, personal digital assistants (PDAs), audio and/or video player, electronic book device, game device, or any combination thereof. One or more frames in the multimedia content subsequent to the frame 100 may also include the face portion 102. The face portion 102 may first be detected in the frame 100 and thereafter be tracked in the subsequent frames. A face box 104 may be placed over the detected face portion 102 as shown in FIG. 1. The face box 104 may refer to a rectangular shaped outline configured to identify a region including the face portion 102 in the frame 100. As the face portion 102 is tracked in subsequent frames, the face box 104 may follow a movement of the face portion 102 for being positioned over the face portion 102 in the subsequent frames.

As described herein, various embodiments provide methods for tracking of a face portion in a plurality of frames. Moreover, various embodiments described herein facilitate detection of the face portion in a frame of the plurality of frames. The detected face portion is tracked in at least one subsequent frame of the plurality of frames. On losing track of the face portion, a color-tracking of the face portion is performed. The color-tracking of the face tracking is performed to re-track the face portion thereby ensuring robust tracking of the face portion. Various embodiments are explained in the description below by using flowcharts and schematic diagrams.

Figure 2:
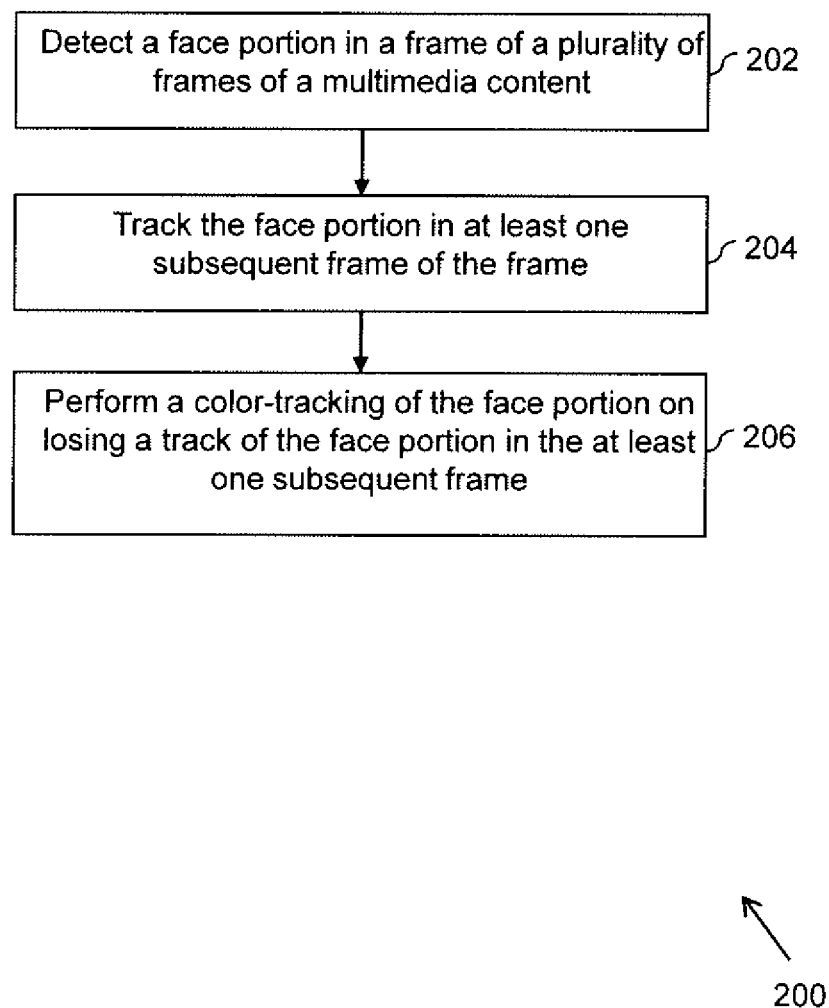
FIG. 2 is a flowchart depicting an example method for tracking of face portion in a plurality of frames, in accordance with an embodiment.

FIG. 2 is a flowchart depicting an example method for tracking of face portion in a plurality of frames, in accordance with an embodiment. It may be understood that for describing the method 200, references herein may be made to FIG. 1. A frame, such as the frame 100 including a face portion, such as a face portion 102 may be a part of the plurality of frames of a multimedia content.

At 202, the face portion is detected in the frame of the plurality of frames of the multimedia content in the apparatus. In an embodiment, the detection of the face portion in the frame involves providing a detection window. The detection window may be configured to overlay onto a set of pixels in the frame. Accordingly, the detection window may be of M×N pixels size. In an embodiment, the detection window may initially be positioned at the upper leftmost corner of the frame.

The set of pixels of the frame bounded by the detection window may be evaluated based on the at least one layer of classification function for detecting the face portion in the set of pixels. In one form, the classification functions typically are based on a set of features of the face portion and corresponding threshold functions. Examples of set of features include, but are not limited to, a pair of eyes and a mouth portion. Each threshold function has a predefined feature threshold for the associated feature indicating a presence of the feature in the detection window. In an embodiment, evaluation of the set of pixels in the detection window involves evaluating the set of pixels based on a first layer of classification function of the at least one layer of classification function. The evaluation may be configured to compute a classification score for one or more angles of orientation. In an embodiment, the one or more angles of orientation may correspond to all possible angles of orientations, such as from a zero degree to 360 degree orientation. An angle with a maximum score of computed classification scores for the first layer of classification function may be selected as an angle of orientation of the face portion. The face portion is detected by performing evaluation of the set of pixels based on the at least one layer of classification function with the angle of orientation of the face portion as computed above.

Figure 3A:
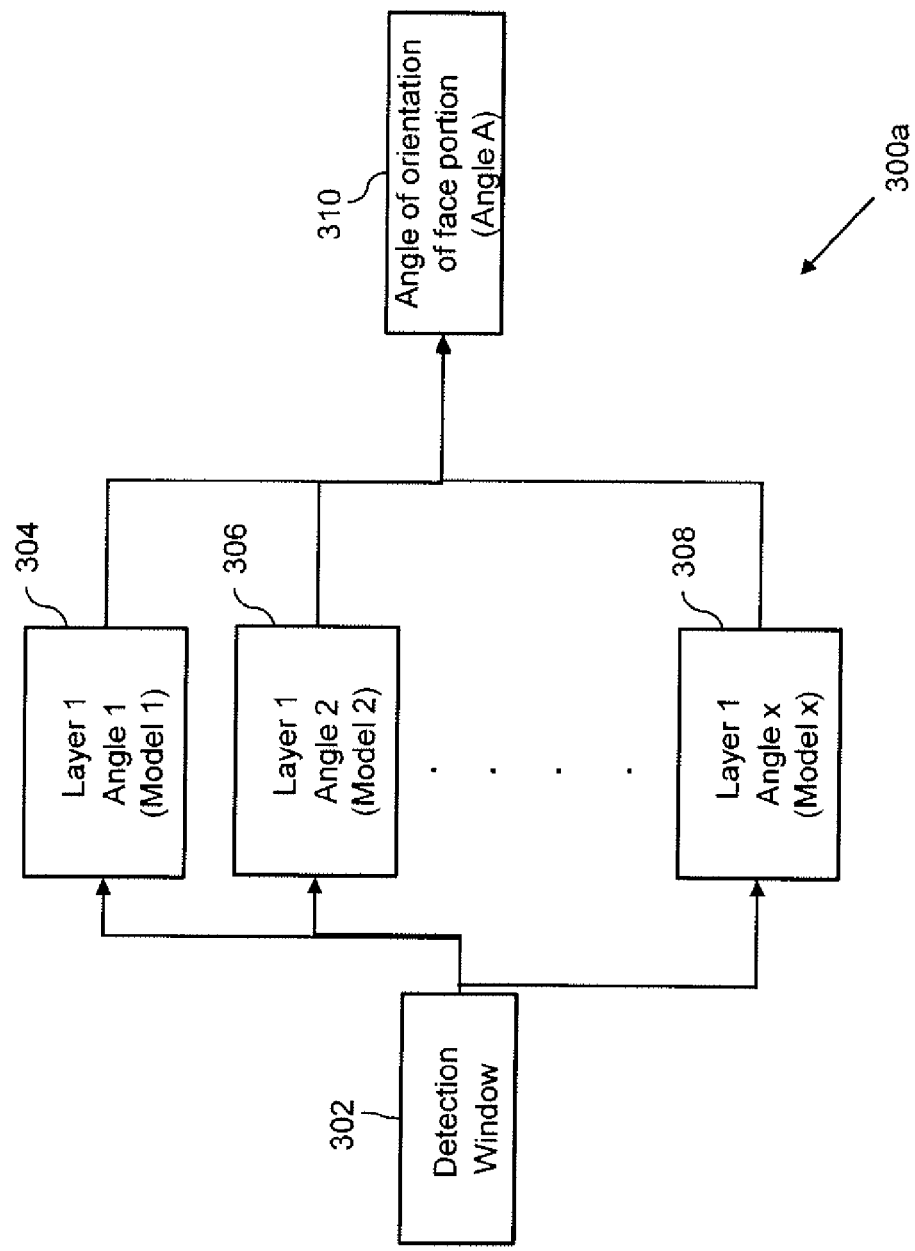
FIGS. 3A and 3B are schematic diagrams illustrating selection of an angle of orientation of face portion from one or more angles of orientation, in accordance with an embodiment.
Figure 3B:
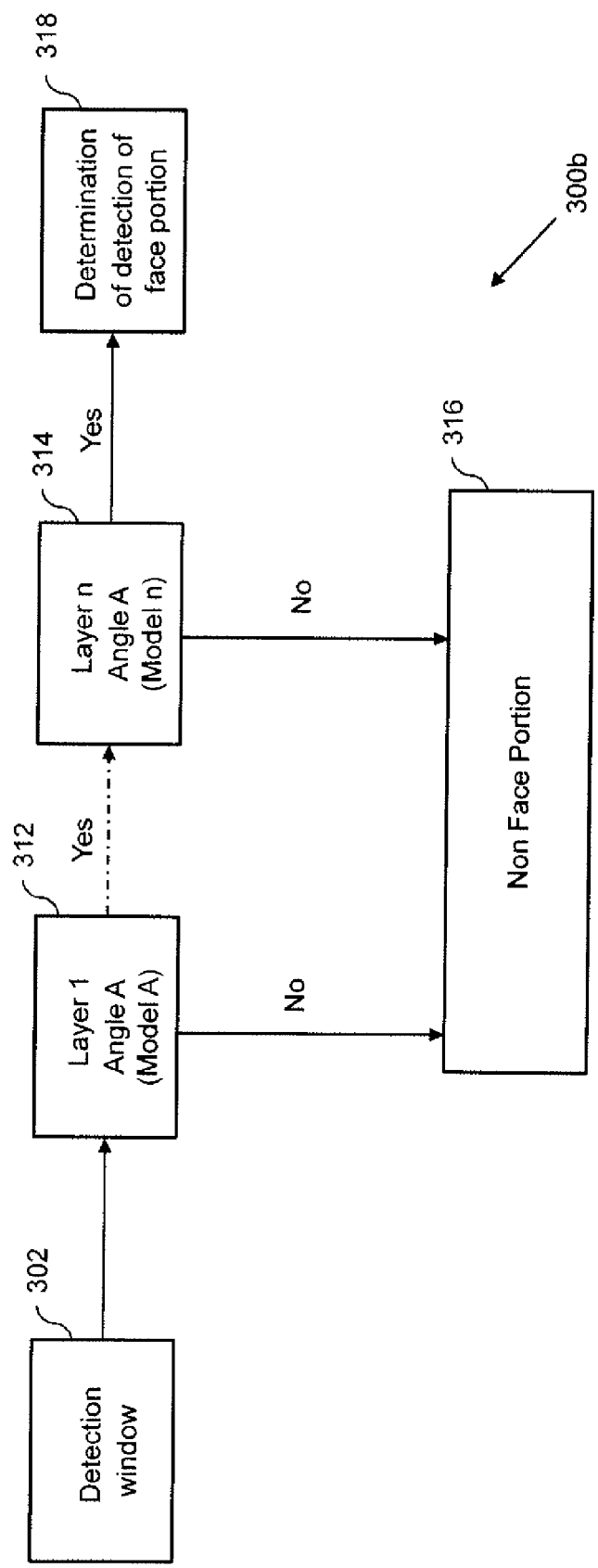

The evaluation of the set of pixels of the frame in the detection window is further explained in FIGS. 3A and 3B. FIGS. 3A and 3B are schematic diagrams illustrating selection of an angle of orientation of face portion from one or more angles of orientation, in accordance with an embodiment. FIG. 3A depicts a schematic representation of a logical sequence 300a for selecting the angle of orientation of the face portion. The detection window is depicted as a block 302 in FIG. 3A. The detection window is configured to overlay onto a set of pixels of the frame. The detection window is positioned over the set of pixels in the frame and the set of pixels bounded by the detection window are evaluated over a first layer of classification function (depicted as 'layer 1' in FIG. 3A) for one or more angles of orientation. For example, in FIG. 3A, block 304 refers to model 1, where for a first angle of orientation (Angle 1), the set of pixels are evaluated over the first layer of classification function. Block 306 refers to model 2, where for a second angle of orientation (Angle 2), the set of pixels are evaluated over the first layer of classification function. Block 308 refers to model x, wherein for the $x^{th}$ angle of orientation (Angle x), the set of pixels are evaluated for the first layer of classification function. In this manner, the set of pixels are evaluated for one or more angle of orientation over the first layer of classification function. The angles, such as angle 1, angle 2 to angle x, may be any angle from 0 degrees to 360 degrees angle orientation.

For one or more angles of orientations, the set of pixels are evaluated over the first layer of classification function. Evaluation of the set of pixels is associated with a classification score corresponding to the angle of orientation for which the set of pixels is evaluated. At 310, the angle of orientation with the maximum score is selected as the angle of orientation of the face portion (hereinafter interchangeably referred to as Angle A). For the angle of orientation of the face portion, the set of pixels are evaluated for the at least one layer of classification function. This is explained in FIG. 3B.

FIG. 3B depicts a schematic representation of a logical sequence 300b for evaluating the set of pixels over the at least one layer of classification function for detecting the face portion. The detection window is again depicted as block 302. The set of pixels bounded by the detection window are evaluated over layers of classification functions, such as layer 1, layer 2 and layer n, with the angle of orientation chosen to be the selected angle of orientation of the face portion (depicted as angle A in FIG. 3B). In FIG. 3B, block 312 refers to model A, wherein the set of pixels are evaluated for the layer 1 of classification function with the angle of orientation chosen to be the angle of orientation of the face portion. If the face portion is detected (depicted as 'Yes' in the FIG. 3B) during the evaluation in model A, the set of pixels are evaluated for next layer of classification function. If the face portion is not detected (depicted as 'No' in the FIG. 3B) during the evaluation in model A, the set of pixels are categorized as non face portion in block 316 and no further evaluation is performed for the set of pixels. Similarly, the set of pixels are evaluated for all remaining layers of classification functions till layer n of classification function depicted by block 314, with the angle of orientation being the angle of orientation of the face portion for each of remaining layers of classification functions. If for a particular layer of classification function, no face portion is detected, then the evaluation of the pixels is stopped and the set of pixels are categorized as non face portion as depicted in block 316. However, if a presence of the face portion is detected for each of the remaining layers of classification functions then it is determined that the face portion is detected in the set of pixels at block 318. In an embodiment, the set of pixels may be evaluated over all the layers of classification functions of the at least one layer of classification function for evaluating the set of pixels in the detection window.

On evaluating the set of pixels in the detection window, in one embodiment, the detection window may be traversed onto a neighboring set of pixels of the set of pixels. In one embodiment, the detection window may be traversed by a first step size onto the neighboring set of pixels. The neighboring set of pixels may be evaluated based on the at least one layer of classification function for detecting the face portion in the neighboring set of pixels. In an embodiment, the first step size for detecting the face portion in the frame is relatively large in x and y directions. An example of a large first step size in x and y directions for the frame corresponding to a quarter video graphics array (QVGA) may be six pixels and four pixels, respectively. Accordingly, the detection window placed initially at (0,0) corresponding to the upper leftmost corner of the frame may traverse to (6,0) in the x direction and (0,4) in the y direction.

On traversing the detection window onto the neighboring set of pixels, the evaluation of the neighboring set of pixels may be performed as explained in FIGS. 3A and 3B, and accordingly, the face portion may be detected in the neighboring set of pixels. The detection window is traversed across an entire area of frame for detecting the face portion in the frame.

In an embodiment, the detection of the face portion is performed in the frame for one or more scales of a plurality of scales and a number of scales of the plurality of scales over which the detection of the face portion is performed is divided across the plurality of frames, where the plurality of scales represents a plurality of sizes of the face portion. For example, scales 0 to 9 may represent face portion sizes in between a small face portion size to a maximum face portion size possible in the frame. For example, a small face portion size may be a 20×20 face size, whereas a maximum face portion size may be a 200×200 face portion size. Thus, the detection of the face portion may be performed for various scales to identify face sizes corresponding to various scales in the frame. Further, the number of scales of the plurality of scales over which the detection of the face portion is performed is divided across the plurality of frames. For example, if the detection of the face portion is to be performed for ten scales, then instead of performing the detection of the face portion for all the ten scales across one frame, only scales 0 to 7 may be evaluated for a first frame, and the scales 8 to 9 may be evaluated for the subsequent frame. In an example, such an approach may be useful in dividing computational load across the plurality of frames. Thus, all of the plurality of frames may be processed. Depending upon a complexity of detecting and/or tracking of the face portion and a frame rate of the viewfinder application, the number of scales over which the detection of the face portion is performed is divided across the plurality of frames.

In an embodiment, at least one of a skin filter and a texture filter is applied across the frame for removing non face portions from the frame. In an embodiment, the application of the at least one of the skin filter and the texture filter is performed prior to evaluation of the set of pixels in the detection window. In an embodiment, the texture filter is based on a local binary pattern (LBP). Accordingly, the detection window at each position in the frame is evaluated based on LBP and accordingly associated one of '1' and '0'. Only those detection windows with a continuous run of 1's (or 0's) above a certain threshold are chosen to be evaluated for the plurality of layers of the classification functions. The detection windows with a string (for example, threshold of three in a row) of 0's (or 1's) are categorized as non face portions and discarded from the evaluation for the at least one layer of classification function. In an example, such an approach reduces computational time for detection of the face portion in the frame.

The detection of the face portion is performed in the plurality of frames. For a frame of the plurality of frames, in which the face portion is not detected, a successive frame of the frame is then evaluated for the presence of the face portion. On detection of the face portion in the frame, the face portion is tracked in the successive frames.

In an embodiment, a starting point, for example, phase of the detection window is shifted in successive frames of the plurality frames by a pre-defined size for detecting the face portion. Such an approach may be performed to mitigate an effect of a large step size in x and y directions used for traversing the detection window within the frame. In an embodiment, the pre-defined size is three in x and y directions. Starting points in four successive frames of the plurality of frames may then be (0,0), (0,3), (3,0) and (3,3). Traversing the detection window by a large first step size and shifting the starting points in successive frames may be equivalent to utilizing a lesser step size for the detection window; however by doing so, a reduction in the number of computations is achieved for detecting the face portion. For example, in comparison to a step size of three, $\frac{1}{4}^{th}$ number of computations may be required for step size equal to six and the computations may get reduced by 75% for every frame. In an example, by shifting the starting points in successive frames, the face portion may be detected in 4 frames as opposed to detecting the face portion in one frame, however, the same face portion is detected with reduced number of computations, thereby reducing a peak time during tracking of the face portion. The shifting of the starting point in the successive frames is depicted in FIGS. 4A and 4B.

Figure 4B:
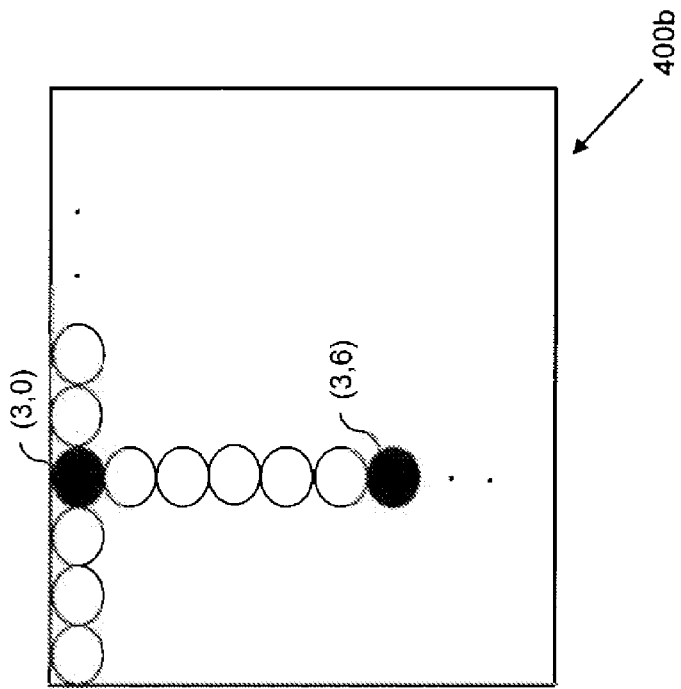
FIGS. 4A and 4B are schematic diagrams illustrating detection window in a frame and a detection window with a shifted starting point in a successive frame of the frame, in accordance with an embodiment.
Figure 4A:
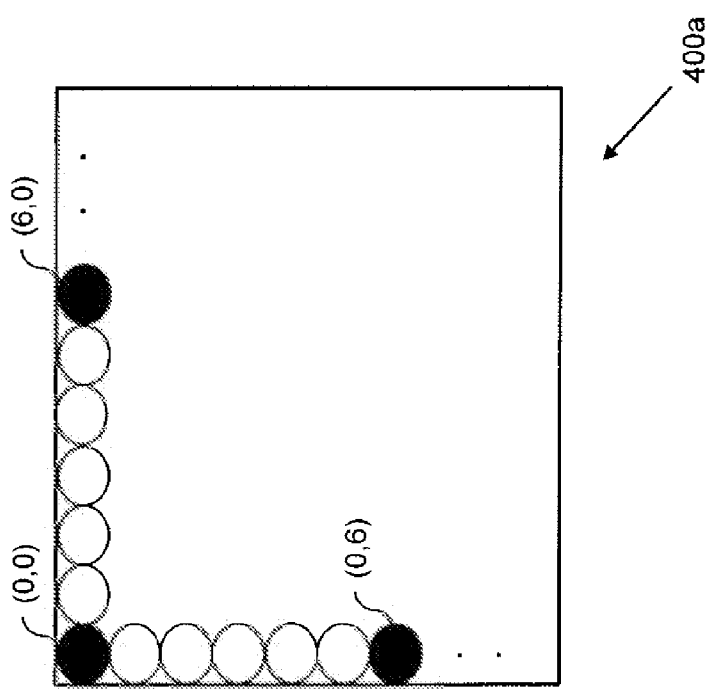

FIGS. 4A and 4B are schematic diagrams illustrating detection window in a frame and a detection window with a shifted starting point in a successive frame of the frame, in accordance with an embodiment. In FIG. 4A, a screenshot 400a depicts a starting point for positioning the detection window in the frame. The starting point is positioned such that the upper left most corner of the detection window coincides with the upper leftmost corner of the frame, for example, at (0,0). A step size for the detection window in the frame is six. Hence, the detection window would traverse to one of (6,0) and (0,6) subsequently. FIG. 4B depicts a screenshot 400b for illustrating a starting point of the detection window in a successive frame to the frame depicted in FIG. 4A. A starting point of the detection window is shifted by a pre-defined size equal to three. Accordingly, the upper leftmost corner of the detection window is depicted to be positioned at (3,0). As the step size for traversing the detection window is six, the detection window would traverse to (3,6) subsequently for detecting the face portion. Accordingly, in frames successive to the frame depicted in FIG. 4B, the starting points of the detection window may be (0, 3) and (3, 3) respectively.

In an embodiment, a step size for the detection window may be different in the x and y directions. For example, the step size in x direction may be chosen to be six and the step size in the y direction may be chosen to be four. Accordingly, positions of the detection window within a frame may be ((0, 0), (6, 0) . . . (0, 4) (6, 4) . . . ), and, with shifted starting point in successive frame, the positions of the detection window within the successive frame may be ((3, 2), (9, 2) . . . (3, 6), (9,6) . . . ).

As described herein, on detection of the face portion, tracking of the face portion is performed. Referring again to FIG. 2, at 204, a tracking of the face portion is performed in at least one subsequent frame of the plurality of frames on detecting the face portion in the frame. Tracking of the face portion may involve detecting the face portion in a region of interest in a subsequent frame of the at least one subsequent frame. The region of interest corresponds to a region in the frame in which the face portion is detected. For example, for a detected face portion of size M×N in the frame, the region of interest may be configured of size 2M×2N centered on co-ordinates of the detected face portion in the frame. The tracking of the face portion, for example, detection of the face portion is performed in a corresponding region of interest, for example, region having co-ordinates matching to the region in which the face portion is detected in the frame, for frames subsequent to the frame in which the face portion was detected.

The detection of the face portion in the region of interest may be performed as explained at 202, for example, a detection window may be provided and a set of pixels in the region of interest bounded by the detection window may be evaluated for detecting the face portion. The evaluation may be performed as explained in FIGS. 3A and 3B, for example, the set of pixels in the region of interest may be evaluated for a first layer of classification function of the at least one layer of classification function and for one or more angles of orientation. For angle of orientations, a classification score may be computed and an angle with the maximum score may be selected to be an angle of orientation of the face portion. The set of pixels may then be evaluated for the at least one layer of classification function with the angle of orientation chosen to be the angle of orientation of the face portion. The face portion may be detected in the region of interest by traversing the detection window across the region of interest and subsequently evaluating each set of pixels bounded by the detection window. In an embodiment, the tracking of the face portion is performed at a second step size, for example, the detection window is traversed by the second step size in the region of interest. In an embodiment, the second step size is two pixels.

In an embodiment, the tracking of the face portion is configured to be performed for a select number of scales of a plurality of scales. The select number of scales may be chosen based on a scale for which the face portion is already detected in the frame. For example, if the face portion was detected at scale 7 in the frame (previous frame), the tracking of the face portion performed in the subsequent frame may be performed for only three scales centered on scale 7, for example, scale 6, scale 8 and scale 9. In an example, such an approach may be used for reducing a number of computations during tracking of the face portion. In an embodiment, on detection of the face portion, the region of interest is disabled for precluding further tracking of the face portion in the region of interest.

In an embodiment, during tracking of the face portion, at any scale, if a number of instances of face portion detected in the region of interest exceeds a threshold count, the instances of face portion are merged and the face portion can be determined to be detected and tracking of the face portion is not performed for remaining scales for the region of interest.

The face portion may be tracked in the region of interest of the subsequent frames. However, a track of the face portion may be lost during the tracking operation. Referring again to FIG. 2, at 206, a color-tracking of the face portion is performed on losing a track of the face portion in the at least one subsequent frame for re-tracking the face portion in the subsequent frames. In an embodiment, the color-tracking of the face portion is initiated on failure to detect the face portion in the region of interest. The color-tracking of the face portion is based on at least one of a luminance projection distance and a color histogram distance.

Figure 5:
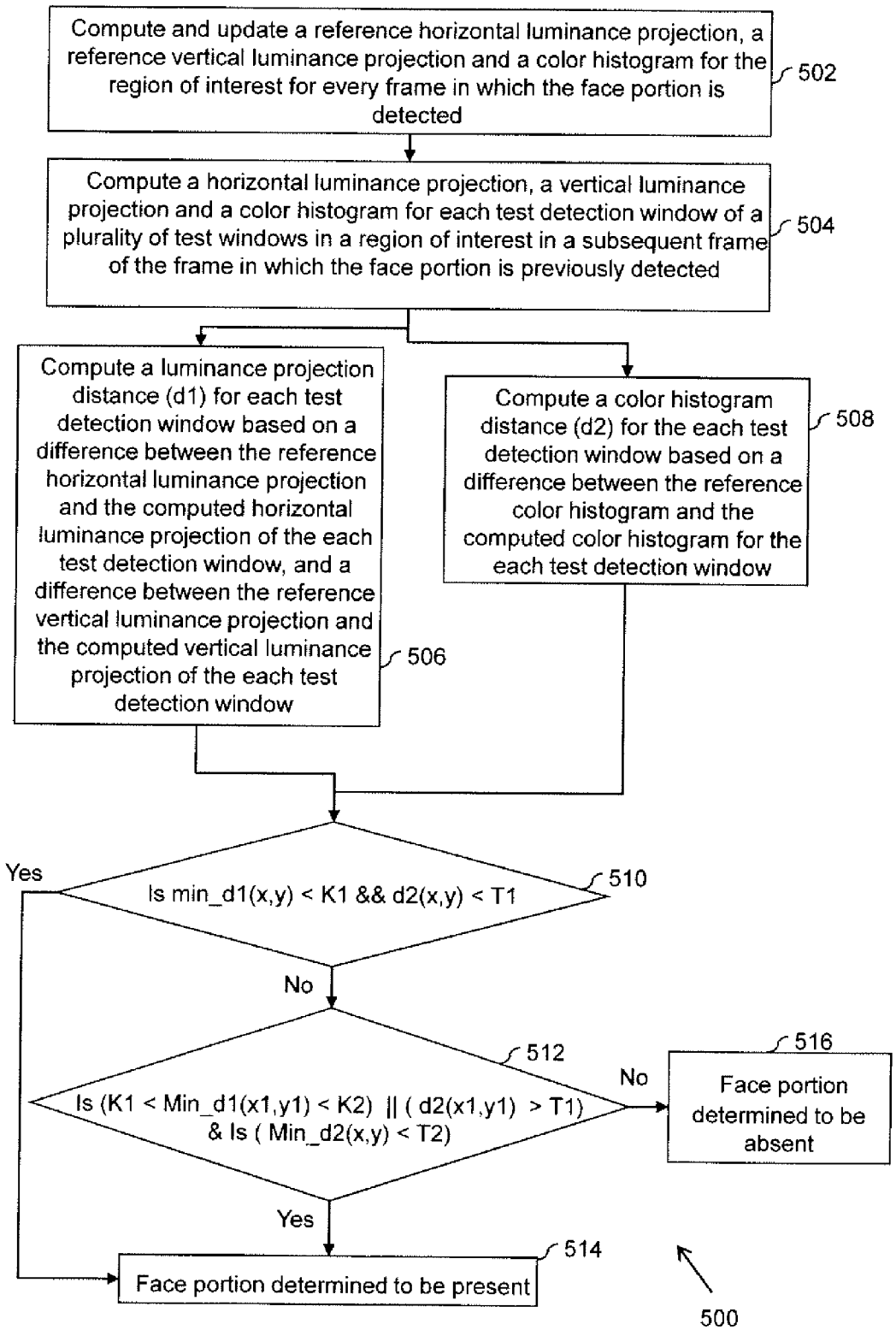
FIG. 5 is a flow chart of a method for performing color-tracking of the face portion, in accordance with an embodiment.

FIG. 5 is a flow chart of a method for performing color-tracking of the face portion, in accordance with an embodiment. On tracking the face portion in the at least one subsequent frame of the plurality of frames, a ref_face_data of the detected face portion is stored and updated for every frame in which the face portion is detected. The ref_face_data includes luminance information (horizontal and vertical projections on luminance plane) and a color histogram of the region of interest (for example, the region in the frame in which the face portion was detected in previous frame). In one embodiment, the ref_face_data is decimated to 20×20 size window and projections are computed on a 20×20 window to reduce computations. A horizontal luminance projection on a face portion of size W×H is a vector of size 1×H obtained by summing all columns for a particular row. Similarly, a vertical luminance projection on a face portion of size W×H is a vector of size 1×W obtained by summing all the rows for a particular column. In one embodiment, the color histogram may be computed from a decimated ref_face_data and may be stored for red, green and blue channels.

At 502, a reference horizontal luminance projection (also referred to as face_H_proj), a reference vertical luminance projection (also referred to as face_V_proj) and a color histogram (also referred to as face_hist) are updated for the region of interest for every frame in which the face portion is detected. On losing a track of the face portion, the color-tracking is initiated. When a face portion of size W×W is missed in a previous frame, a current region of interest is considered as 2 W×2 W centered on co-located position of previous face portion's coordinates in current frame. In an embodiment, the face of size W×W and the region of interest of size 2 W×2 W are downscaled to 20×20 and 40×40 respectively. In the region of interest, a 20×20 test window is tiled across entire frame and horizontal projections, vertical projections and color histograms are computed for every test window.

Accordingly, at 504, a horizontal luminance projection, a vertical luminance projection and a color histogram for each test detection window of a plurality of test detection windows in a region of interest in a subsequent frame of the at least one subsequent frame are computed. The region of interest has coordinates matching to the coordinates of the detected face portion in a previous frame. In an example, the region of interest is centered on a region in which the face portion is detected in the frame. The horizontal luminance projection, the vertical luminance projection and the color histogram for the each test detection window are also referred to as test_H_proj_x_y, test_V_x_y and test_hist_x_y respectively (test_H_proj_x_y is the horizontal projection vector of a 20×20 window centered at location (x, y) in the region of interest; test_V_x_y is the vertical projection vector of a 20×20 window centered at location (x, y) in the region of interest; and test_hist_x_y is the color histogram implemented using 16 bins by scaling pixel values in the region of interest).

In an embodiment, the luminance projection distance (also referred to as d1 (face, test_x_y) or 'd1') is thereafter computed based on the horizontal luminance projection and the vertical luminance projection of the each test detection window and a reference horizontal luminance projection and a reference vertical luminance projection. Accordingly, at 506, the luminance projection distance for the each test detection window is computed based on an absolute value of difference between the reference horizontal luminance projection (face_H_proj) and the computed horizontal luminance projection (test_H_proj_x_y) of the each test detection window, and an absolute value of difference between the reference vertical luminance projection (face_V_proj) and the computed vertical luminance projection (test_V_proj_x_y) of the each test detection window as below:

$$d1(\text{face,test\_}x\_y) = \Sigma\{\text{abs}(\text{face\_}H\_\text{proj}(i) - \text{test\_}H\_\text{proj\_}x\_y(i)) + \text{abs}(\text{face\_}V\_\text{proj}(i) - \text{test\_}V\_\text{proj\_}x\_y(i))\}$$

where luminance projection distance ((d1 (face, test_x_y) or d1) between reference projections and test projections is computed for every test window centered at locations (x, y) in the region of interest, and, where i ranges from 1 to 20 and Test_H_proj_x_y(y)=∫I(x,y).dx, where I(x,y) is a box of size 20×20.

A color histogram distance for the test detection windows (also referred to as d2 (face, test_x_y) or 'd2') is computed based on the color histogram for the each test detection window and a reference color histogram. Accordingly, at 508, the color histogram distance is computed based on a difference between the reference color histogram and the computed color histogram for the each test detection window as below:

$$d2(\text{face,test\_}x\_y) = \Sigma\Sigma\{\text{face\_hist}[i][c] - \text{test\_hist\_}x\_y[i][c]\} * \{\text{face\_hist}[i][c] - \text{test\_hist\_}x\_y[i][c]\}$$

where color histogram is built for every 20×20 test window centered at (x, y) in the decimated region of interest and where i is the bin index 0<=i<16 and c is the color channel index, 0<=c<3.

A presence of the face portion in the region of interest is determined based on the luminance projection distance (d1) and the color histogram distance (d2) for the each test detection window. The face portion is determined to be present if a minimum value of the luminance projection distance is lower than a first threshold value (K1) and the color histogram distance is lower than a second threshold value (T1). Accordingly, at 510, it is checked whether the minimum value of the luminance projection distance is lower than K1 and the color histogram distance is lower than T1. If minimum value of d1 at (x1, y1) location is represented as Min_d1(x1, y1) and a d2 (x1, y1) is a representation of a value of the color histogram distance, then the determination of the presence of the face portion may be based on the expression:

If (Min_d1(x1, y1)<K1) && (d2(x1, y1)<T1)) then the face portion can be determined to be detected.

However, if the expression is not satisfied, the face portion is determined to be present if the minimum value of the luminance projection distance (d1) is between K1 and a third threshold value (K2) and a minimum value of the color histogram distance is greater than T1 but lower than a fourth threshold value (T2). Accordingly, at 510, it is checked whether the minimum value of the luminance projection distance (d1) is between K1 and K2 and a minimum value of the color histogram distance is lower than T2. If minimum value of d2 at (x1, y1) location is Min d2(x1, y1), then the determination of the presence of the face portion may be expressed as follow:

```
If (K1 < Min_d1(x1,y1) < K2) || (d2(x1,y1) > T1)
{
    If( Min_d2(x,y) < T2)
    {
        Face portion is determined to be present
    }
}
```

Other wise face portion is determined to be absent.

Furthermore, the face portion may be determined to be absent upon determination of the minimum value of the luminance projection distance (d1) to be greater than the third threshold value (K2). In an embodiment, the values of the first threshold value (K1), the second threshold value (T1), the third threshold value (K2) and the fourth threshold value (T2) are 15*256, 40*256, 7000 and 6500 respectively.

Thus, a determination of the face portion is performed in the test detection windows, and, the face portion is determined to be present in the region of interest based on the determination of the face portion in the test detection windows.

Figure 6:
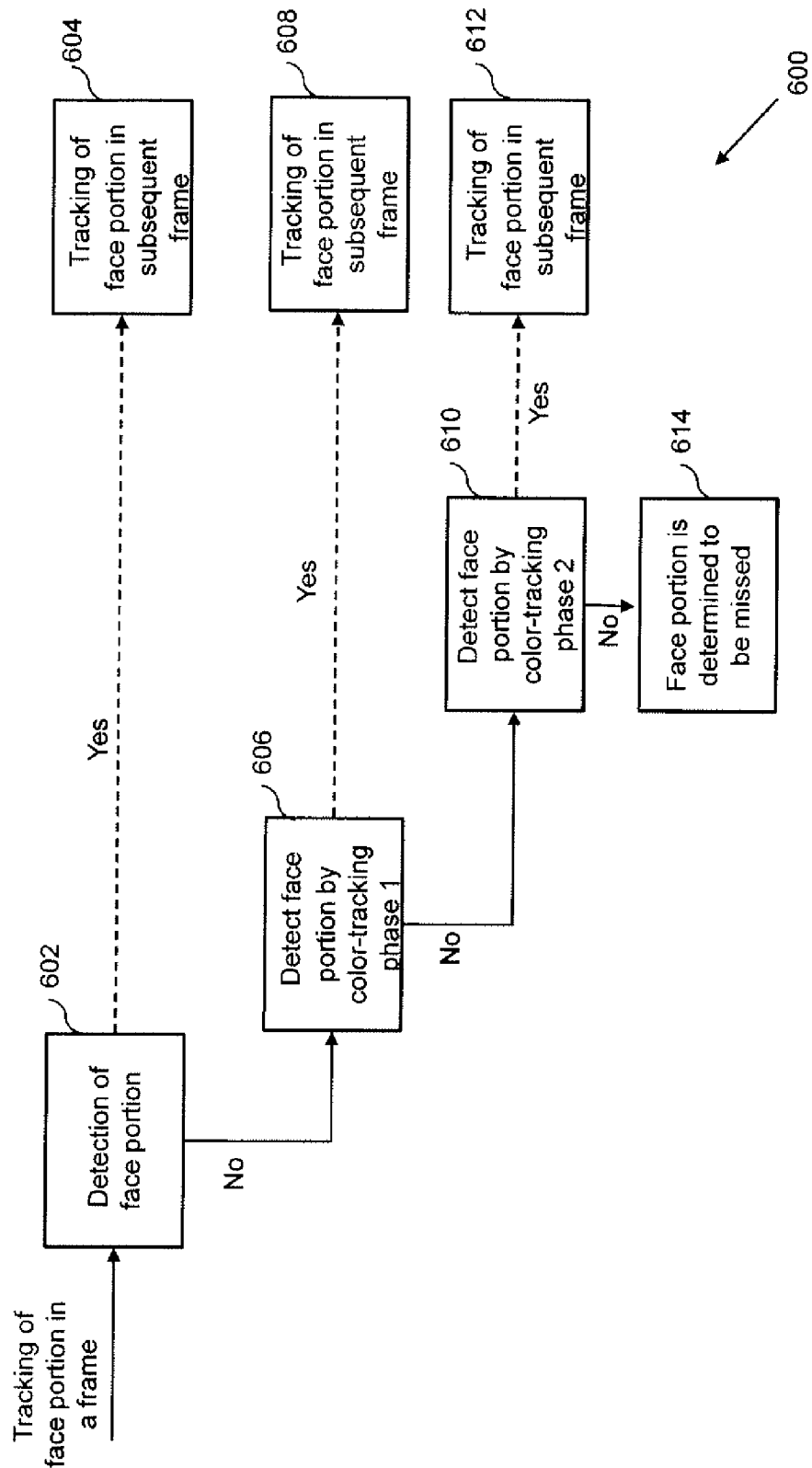
FIG. 6 is a schematic diagram illustrating a logical sequence for performing a color-tracking of the face portion, in accordance with an embodiment.

In an embodiment, the color-tracking of the face portion may be divided into two phases—computing the luminance projection distance (also referred to as 'color-tracking phase 1') and computing the color histogram distance (also referred to as 'color-tracking phase 2'). The two phases of the color-tracking are explained in FIG. 6. FIG. 6 is a schematic diagram illustrating a logical sequence 600 for performing a color-tracking of the face portion, in accordance with an embodiment. A tracking of the face portion in a frame is performed as explained in FIG. 2. At 602, a presence of a face portion is detected in the frame. If the face portion is detected, for example, not missed, the tracking of the face portion is continued in a subsequent frame at 604. If track of the face portion is missed, the color-tracking of the face portion is performed in the frame. On losing track of the face portion, color-tracking phase 1 may be performed, for example, the luminance projection distance may be calculated, as explained in FIG. 5. Based on the luminance projection distance, it can be determined whether the face portion is detected at 606. If the face portion is detected by the color-tracking phase 1, the tracking of the face portion is continued in subsequent frame at 608. If the face portion is not detected during the color-tracking phase 1, the color-tracking phase 2 is performed in the frame, for example, the color histogram distance may be calculated, as explained in FIG. 5. Based on the color histogram distance, it can be determined whether the face portion is detected during the color-tracking phase 2 at 610. If the face portion is detected during the color-tracking phase 2, the tracking of the face portion is continued in subsequent frame at 612. If the face portion is not detected during the color-tracking phase 2, the face portion is determined to be missed in the frame, at 614.

In an embodiment, the tracking of the face portion, color-tracking phase 1 and color-tracking phase 2 can be operated separately across several frames to distribute a complexity across frames or all three may be performed in a single frame.

In an embodiment, the color-tracking is performed upon losing track of the face portion and upon tracking the face portion for a pre-defined number of successive frames of the at least one subsequent frame, for example, the color-tracking is initiated only after the face portion is tracked for a pre-defined number of successive frames and thereafter a track of the face portion is lost. The pre-defined number (n) of successive frames of the least one subsequent frame may be a constant and may be referred to as 'stability threshold'. In an embodiment, the pre-defined number (n) may be any number from 2 to 9. In an example, such an approach will provide robustness and will eliminate any misleading false tracking even when the detection of the face portion gives any spurious false positive.

In an embodiment, the methods 200 or 500 further comprises computing the reference color histogram for each region on interest in which face portion is tracked upon tracking the face portion for a pre-defined number of successive frames (K) of at least one subsequent frame. The pre-defined number of successive frames (K) may be a constant and may be referred to as 'reliability threshold'. In an embodiment, the pre-defined number (n) may be any number from 2 to 9. In an example, such an approach will ensure robustness against the color-tracking getting mislead by a false positive during the detection of the face portion.

The adaptability of the color-tracking in a varying scales environment (zooming in or zooming out) can also be addressed. The color-tracking can be performed for different scales and a best matching candidate may be computed by merging a face box (text box enveloping the detected face portion) across all scales. For example, if the face portion tracked is of size M×M, then the color-tracking can be performed in different scales M×M, 1.25M×1.25M, and 0.75 M×0.75 M and a best match for the face portion may be computed by merging the detected face portions across all scales. Such an approach may ensure that the color-tracking will successfully track the face portion in scale variations like zooming in and zooming out.

Figure 7:
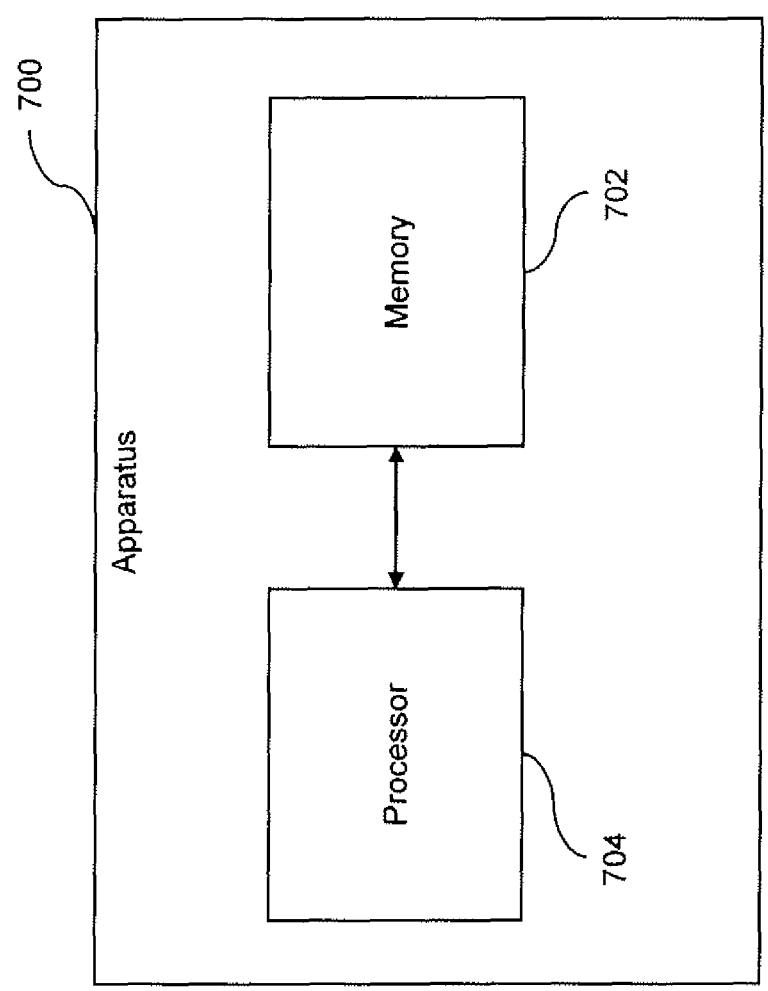
FIG. 7 is a block diagram of an apparatus for tracking of face portion in a plurality of frames, in accordance with an embodiment.

FIG. 7 is a block diagram of an apparatus, such as an apparatus 700 for tracking of face portion in a plurality of frames, in accordance with an embodiment. The apparatus 700 may include at least one memory 702 and at least one processor 704. It will be apparent to a person skilled in the art that the apparatus 700 may include more than one memory and more than one processor. The memory 702 may be configured to store computer program code, and multimedia content such as image frames and video frames. The memory 702 may be a volatile memory or a non volatile memory. Examples of the one or more memory 702 include, but are not limited to, a hard drive, a Read Only Memory (ROM), a Random Access Memory (RAM), Erasable Programmable Read-Only Memory (EPROM), Electrically Erasable Programmable Read-Only Memory (EEPROM), Programmable Read-Only Memory (PROM), CD-ROM, or flash memory. The memory 702 may be permanently contained within the apparatus 700. Further, example of the at least one processor may include, but are not limited to, one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s).

The apparatus 700 can include a multimedia content such as image frames or video frames. Alternatively, the apparatus 700 may receive the multimedia content from at least one of a digital camera/camcorder, any type of mobile terminal, a fixed terminal, or a portable terminal including a mobile handset, a multimedia computer, a multimedia tablet, an Internet node, a communicator, a desktop computer, a laptop computer, a personal digital assistants (PDAs), an audio and/or a video player, an electronic book device and a game device. An object, such as a face portion, may be required to be detected in an image frame and further tracked in subsequent image frames. Tracking objects in image frames may have applications in video editing, video compression, security and surveillance, human computer interaction and the like. The memory 702 and the computer program code are configured to, with the processor 704, to cause the apparatus 700 to track the face portion in the plurality of frames.

The memory 702 and the computer program code are configured to, with the processor 704, to cause the apparatus 700 to detect a presence of a face portion in a frame of a plurality of frames of the multimedia content. In an embodiment, the apparatus 700 is further caused, at least in part, to provide a detection window for detecting the face portion in the frame. The detection window may be configured to overlay onto a set of pixels in the frame. Accordingly, the detection window may be of M×N pixels size. The detection window may initially be positioned at the upper leftmost corner of the frame.

In an embodiment, the apparatus 700 is further caused, at least in part, to evaluate the set of pixels bounded by the detection window based on the at least one layer of classification function for detecting the face portion in the set of pixels. In an embodiment, evaluation of the set of pixels in the detection window involves evaluating the set of pixels based on a first layer of classification function of the at least one layer of classification function. The evaluation may be configured to compute a classification score for one or more angles of orientation. The one or more angles of orientation may correspond to all possible angles of orientations, such as from zero degree to 360 degree orientation. As explained in FIG. 3A, an angle with a maximum score of computed classification scores for the first layer of classification function may be selected as an angle of orientation of the face portion. The face portion can be detected by performing evaluation of the set of pixels based on the at least one layer of classification function and the angle of orientation of the face portion, as explained in FIG. 3B. In an embodiment, the set of pixels may be evaluated over all the layers of classification functions of the at least one layer of classification function for evaluating the set of pixels in the detection window.

In an embodiment, the apparatus 700 is further caused, at least in part, to traverse the detection window by a first step size onto a neighboring set of pixels of the set of pixels. The neighboring set of pixels are evaluated based on the at least one layer of classification function for detecting the face portion in the neighboring set of pixels. In an embodiment, the first step size for detecting the face portion in the frame can be relatively large in x and y directions. An example of a large first step size in x and y directions may be six pixels and four pixels, respectively. Accordingly, the detection window placed initially at (0,0) corresponding to the upper leftmost corner of the frame may traverse to one of (6,0) in the x direction and (0,4) in the y direction as explained in FIG. 2.

On traversing the detection window onto the neighboring set of pixels, the evaluation of the neighboring set of pixels may be performed as explained in FIGS. 3A and 3B, and accordingly, the face portion may be detected in the neighboring set of pixels. The detection window is traversed across an entire area of frame for detecting the face portion in the frame.

In an embodiment, the apparatus 700 is further caused, at least in part, to configure detecting of the face portion in the frame for one or more scales of a plurality of scales and a number of scales of the plurality of scales over which the detection of the face portion is performed is divided across the plurality of frames, where the plurality of scales represents a plurality of sizes of the face portion. For example, scales 0 to 9 may represent face portion sizes in between a small face portion size to a maximum face portion size possible in the frame. For example, a small face portion size may be a 20×20 face portion size, whereas a maximum face portion size may be a 200×200 face portion size. Thus, the detection of the face portion may be performed for various scales to identify face sizes corresponding to various scales in the frame. Further, the number of scales of the plurality of scales over which the detection of the face portion is performed is divided across the plurality of frames. For example, if the detection of the face portion is to be performed for ten scales, then instead of performing the detection of the face portion for all the ten scales across one frame, only scales 0 to 7 may be evaluated for a first frame, and the scales 8 to 9 may be evaluated for the subsequent frame.

In an embodiment, the apparatus 700 is further caused, at least in part, to apply at least one of a skin filter and a texture filter across the frame for removing non face portions from the frame. In an embodiment, the application of the at least one of the skin filter and the texture filter is performed prior to evaluation of the set of pixels in the detection window. In an embodiment, the texture filter is based on a local binary pattern (LBP). In accordance with LBP, if an orientation is changed by a multiple of 90 degrees, then an equivalent LBP orientation can be achieved by just right/left shifting by multiple of 2 bits and vertical or horizontal mirroring of LBP face space. In case for searching for multiple of 90 degrees rotated face portions, an original LBP image can be right/left shifted and horizontally/vertically mirrored to get an effect of rotation. However, utilizing only one model with zero degree orientation is sufficient to search for the face portion rotation in multiples of 90 degrees on account of rotational invariance feature of LBP.

Accordingly, the detection window at each position in the frame is evaluated based on LBP and accordingly associated one of '1' and '0'. Only those detection windows with a continuous run of 1's (or 0's) above a certain threshold are chosen to be evaluated for the plurality of layers of the classification functions. The detection windows with a string (for example, threshold of three in a row) of 0's (or 1's) are categorized as non face portions and discarded from the evaluation for the plurality of layers of classification functions. In an example, such an approach reduces computational time for detection of the face portion in the frame.

The detection of the face portion is performed in the plurality of frames. For a frame of the plurality of frames, in which the face portion is not detected, a successive frame of the frame is then evaluated for the presence of the face portion. On detection of the face portion in the frame, the face portion is tracked in the successive frame.

In an embodiment, apparatus 700 is further caused, at least in part, to shift a starting point (phase) of the detection window in successive frames of the plurality frames by a pre-defined size for detecting the face portion. In an embodiment, the pre-defined size is three in x and y directions. Starting points in four successive frames of the plurality of frames may then be (0,0), (0,3), (3,0) and (3,3) as explained in FIGS. 4A and 4B.

In an embodiment, apparatus 700 is further caused, at least in part, to perform tracking of the face portion in at least one subsequent frame of the plurality of frames on detecting the face portion in the frame. Tracking of the face portion may involve detecting the face portion in a region of interest in a subsequent frame of the at least one subsequent frame. The region of interest corresponds to a region in the frame in which the face portion is detected. For example, for a detected face portion of size M×N in the frame, the region of interest may be configured of size 2M×2N centered on co-ordinates of the detected face portion in the frame. The tracking of the face portion, for example, detection of the face portion is performed in a corresponding region of interest, for example, region having co-ordinates matching to the region in which the face portion is detected in the frame, for frames subsequent to the frame in which the face portion was detected.

The detection of the face portion in the region of interest may be performed as explained in FIG. 2, for example, a detection window may be provided and a set of pixels in the region of interest bounded by the detection window may be evaluated for the detecting the face portion. The evaluation may be performed as explained in FIGS. 3A and 3B, for example, the set of pixels in the region of interest may be evaluated for a first layer of classification function of the at least one layer of classification function and for one or more angles of orientation. For angle of orientations, a classification score may be computed and an angle with the maximum score may be selected to be the angle of orientation of the face portion. The set of pixels may then be evaluated for the at least one layer of classification function with the angle of orientation chosen to be the angle of orientation of the face portion. The face portion may be detected in the region of interest by traversing the detection window across the region of interest and subsequently evaluating each set of pixels bounded by the detection window. In an embodiment, the tracking of the face portion is performed at a second step size, for example, the detection window is traversed by the second step size in the region of interest. In an embodiment, the second step size is two pixels.

In an embodiment, apparatus 700 is further caused, at least in part, to configure the tracking of the face portion to be performed for a select number of scales of a plurality of scales. The select number of scales may be chosen based on a scale for which the face portion is already detected in the frame. For example, if the face portion was detected at scale 7 in the frame (previous frame), then the tracking of the face portion performed in the subsequent frame may be performed for only three scales centered on scale 7, for example, scale 6, scale 8 and scale 9. In an example, such an approach may be used for reducing a number of computations during tracking of the face portion. In an embodiment, on detection of the face portion, the region of interest is disabled for precluding further tracking of the face portion in the region of interest.

In an embodiment, during tracking of the face portion, at any scale, if a number of instances of face portion detected in the region of interest exceeds a threshold count, the instances of face portion are merged and the face portion can be determined to be detected and tracking of the face portion is not performed for remaining scales for the region of interest detected as the face portion.

The face portion may be tracked in the corresponding region of interest of the at least one subsequent frame. However, a track of the face portion may be lost during the tracking operation. A color-tracking of the face portion is performed on losing a track of the face portion in the at least one subsequent frame for re-tracking the face portion in the at least one subsequent frame. In an embodiment, the color-tracking of the face portion is initiated on failure to detect the face portion in the region of interest. In an embodiment, the color-tracking of the face portion is based on at least one of a luminance projection distance and a color histogram distance.

In an embodiment, apparatus 700 is further caused, at least in part, to perform the color-tracking by computing a horizontal luminance projection, a vertical luminance projection and a color histogram for each test detection window of a plurality of test detection windows centered on the region of interest in a subsequent frame of the at least one subsequent frame. In an embodiment, apparatus 700 is further caused, at least in part, to compute a luminance projection distance for the each test detection window based on the horizontal luminance projection and the vertical luminance projection for the each test detection window and a reference horizontal luminance projection and a reference vertical luminance projection. In an embodiment, the apparatus 700 is further caused, at least in part, to compute a color histogram distance for the each test detection window based on the color histogram for the each test detection window and a reference color histogram. Further, a presence of the face portion is determined in the region of interest based on the luminance projection distance and the color histogram distance for the each test detection window.

As explained in FIG. 5, a ref_face_data of the detected face portion is stored and updated for every frame in which the face portion is detected. The ref_face_data includes luminance information (horizontal and vertical projections on luminance plane) and a color histogram of the region of interest (for example, the region in the frame in which the face portion was detected). The ref_face_data is decimated to 20×20 size window and projections are computed on a 20×20 window to reduce computations. A horizontal luminance projection on a face portion of size W×H is a vector of size 1×H obtained by summing all columns for a particular row. Similarly, a vertical luminance projection on a face portion of size W×H is a vector of size 1×W obtained by summing all the rows for a particular column. The color histogram may be computed from a decimated ref_face_data and may be stored for red, green and blue channels.

Further, a horizontal luminance projection, a vertical luminance projection and a color histogram for the each test detection window in a region of interest in a subsequent frame of the at least one subsequent frame are computed. The region of interest has coordinates matching to the coordinates of the detected face portion in a previous frame. In an example, the region of interest is centered in a region in which the face portion is detected in the frame. The luminance projection distance for the each test detection window is thereafter computed based on the horizontal luminance projection and the vertical luminance projection of the each test detection window and a reference horizontal luminance projection and a reference vertical luminance projection. In an embodiment, apparatus 700 is further caused, at least in part, to compute the luminance projection distance for the each test detection window based on an absolute value of a difference between the reference horizontal luminance projection and the computed horizontal luminance projection of the each test detection window, and an absolute value of a difference between the reference vertical luminance projection and the computed vertical luminance projection of the each test detection window as explained in FIG. 5.

In an embodiment, apparatus 700 is further caused, at least in part, to compute the color histogram distance for the each test detection window based on the color histogram for the each test detection window and a reference color histogram. Accordingly, the color histogram distance for the each test detection window is computed based on a difference between the reference color histogram and the computed color histogram for the each test detection window as explained in FIG. 5.

In an embodiment, apparatus 700 is further caused, at least in part, to determine a presence of the face portion based on the luminance projection distance (d1) and the color histogram distance (d2). In an embodiment, apparatus 700 is further caused, at least in part, to determine the face portion to be present if a minimum value of the luminance projection distance is lower than a first threshold value (K1) and the color histogram distance is lower than a second threshold value (T1) as explained in FIG. 5. In an embodiment, apparatus 700 is further caused, at least in part, to determine the face portion to be present in the region of interest if the minimum value of the luminance projection distance (d1) is between K1 and a third threshold value (K2) and a minimum value of the color histogram distance is greater than T1 but lower than a fourth threshold value (T2).

In an embodiment, apparatus 700 is further caused, at least in part, to determine the face portion to be absent if the minimum value of the luminance projection distance (d1) is greater than the third threshold value (K2). In an embodiment, the values of the first threshold value (K1), the second threshold value (T1), the third threshold value (K2) and the fourth threshold value (T2) are 15*256, 40*256, 7000 and 6500, respectively.

Thus, a determination of the face portion is performed in the each test detection window, and, the face portion is determined to be present in the region of interest based on the determination of the face portion in the each test detection window.

In an embodiment, apparatus 700 is further caused, at least in part, to perform the color-tracking upon losing track of the face portion and upon tracking the face portion for a pre-defined number of successive frames of the at least one subsequent frame, for example, the color-tracking is initiated only after the face portion is tracked for a pre-defined number of successive frames and thereafter a track of the face portion is lost. The pre-defined number (n) of successive frames of the least one subsequent frame may be a constant and may be referred to as 'stability threshold'. In an embodiment, the pre-defined number (n) may be any number from 2 to 9.

In an embodiment, apparatus 700 is further caused, at least in part, to compute the reference color histogram for each region on interest in which face portion is tracked upon tracking the face portion for a pre-defined number of successive frames (K) of at least one subsequent frame. The pre-defined number of successive frames (K) may be a constant and may be referred to as 'reliability threshold'. In an embodiment, the pre-defined number (n) may be any number from 2 to 9.

Furthermore, one embodiment of the present disclosure may take the form of a computer program product for tracking of face portion in plurality of frames of a multimedia content, on a computer-readable storage medium having computer-readable program instructions (e.g., computer software) embodied in the computer-readable storage medium. Any suitable computer-readable storage medium (hereinafter 'storage medium') may be utilized including hard disks, CD-ROMs, RAMs, ROMs, Flash memories, optical storage devices, or magnetic storage devices.

Various embodiments are described above with reference to block diagrams and flowchart illustrations of methods and apparatuses embodying the present disclosure. It will be understood that functionalities of various blocks of the block diagram and flowchart illustrations, and combinations of functionalities of various blocks of the block diagrams and the flowchart illustrations, respectively, may be implemented by a set of computer program instructions. These set of instructions may be loaded onto a general purpose computer, special purpose computer, or other programmable data processing apparatus to produce a machine, such that the set of instructions when executed on the computer or other programmable data processing apparatus create a means for implementing the functions specified in the flowchart block or blocks. Although other means for implementing the functions including various combinations of hardware, firmware and software as described herein may also be employed.

These computer program instructions may also be stored in a computer-readable medium that can direct a computer or other programmable data processing apparatus to function in a particular manner, such that the instructions stored in the computer-readable memory produce an article of manufacture including computer-readable instructions for implementing the function specified in the flowchart of the methods 200 or 500. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing functions/methods specified in the flowchart of the methods 200 and/or 500.

In one embodiment, the present disclosure also provides an apparatus for face portion tracking in the plurality of frames stored in the apparatus or any external device accessible by the apparatus. The apparatus may include various means for performing at least one function in accordance with various embodiments, including those shown and described herein. It should be understood that the apparatus may include alternative means for performing at least one like functions, without departing from the spirit and scope of the present disclosure.

An entity capable of operating as apparatus (for example, the apparatus 700) may include means for detecting a face portion in a frame of a plurality of frames in a multimedia content of the apparatus. The apparatus further includes means for tracking the face portion in at least one subsequent frame of the frame. The apparatus further includes means for performing a color-tracking of the face portion on losing a track of the face portion in the at least one subsequent frame. The color-tracking can be performed for re-tracking the face portion in the at least one subsequent frame. Such means of the apparatus may be implemented using hardware, software, firmware, or combination thereof. For the sake of brevity of the description, the functionalities of said means for providing access to the digital images are not described again as these functionalities are already described in the flowchart of methods 200, and 500, and the apparatus 700.

The processes described herein for face portion tracking may be implemented via software, hardware, firmware or a combination of software and/or firmware and/or hardware. For example, the processes described herein, including updating the set of image elements and detecting a pattern of navigation of user input, may be advantageously implemented via processor(s), Digital Signal Processing (DSP) chip, an Application Specific Integrated Circuit (ASIC), Field Programmable Gate Arrays (FPGAs), etc. Such hardware for performing the described functions is detailed below.

Figure 8:
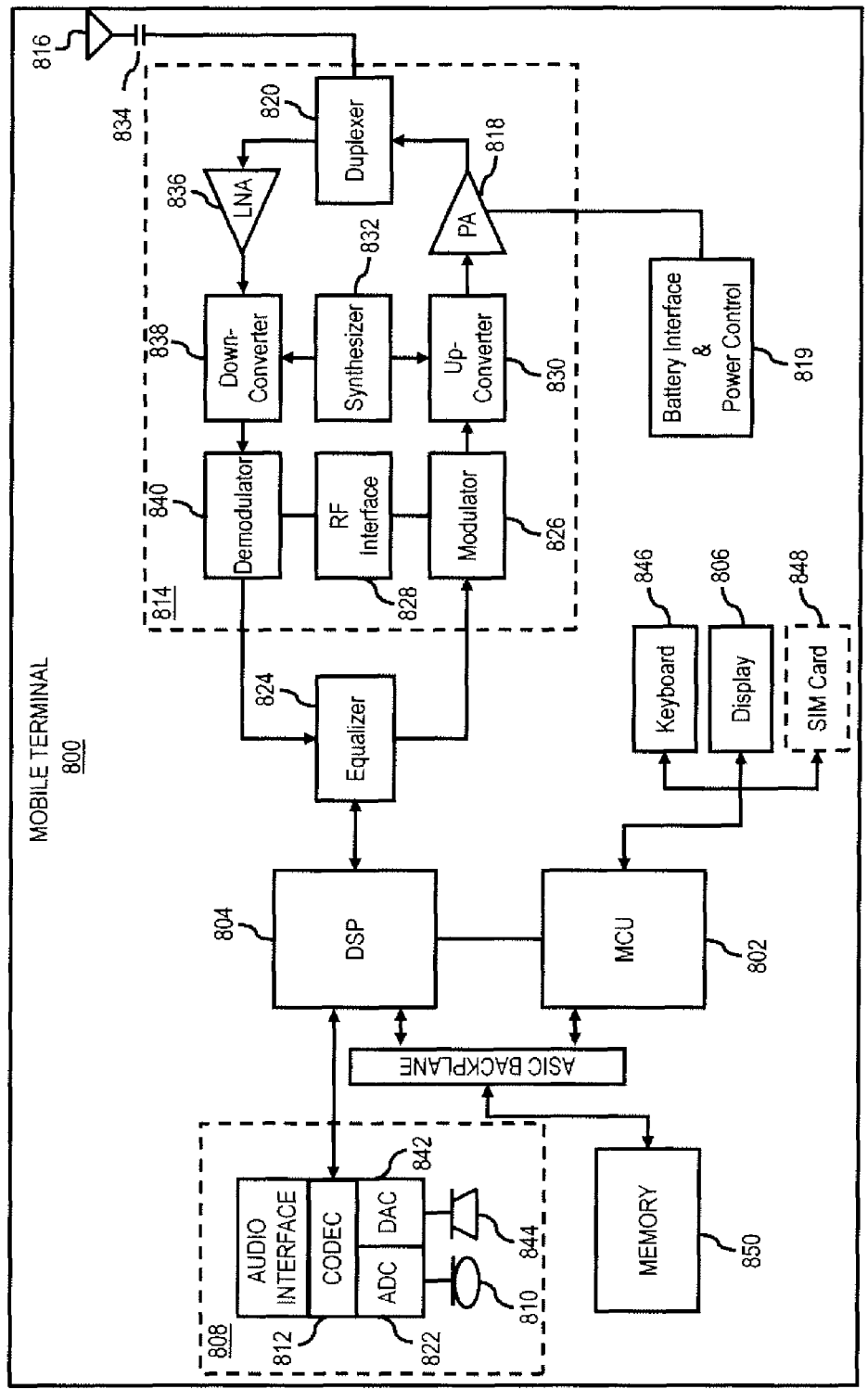
FIG. 8 is a diagram of a mobile terminal, in accordance with an embodiment.

FIG. 8 is a diagram of a mobile terminal 800, in accordance with an embodiment. The mobile terminal 800 may be an example of the apparatus 700, or means for tracking of face portion in plurality of frames as described above, according to one embodiment. Further, the methods described herein such as the methods 200, 500 and other variations thereof can be implemented in the mobile terminal 800. In some embodiments, mobile terminal 800, or a portion thereof, constitutes a means for detecting a face portion in a frame of a plurality of frames in a multimedia content, tracking the face portion in at least one subsequent frame of the frame, performing a color-tracking of the face portion on losing a track of the face portion in the at least one subsequent frame. Generally, the mobile terminal 800 is often defined in terms of front-end and back-end characteristics. The front-end of the mobile terminal 800 encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the mobile terminal 800 include a Main Control Unit (MCU) 802, a Digital Signal Processor (DSP) 804, and a receiver/transmitter unit including a microphone gain control unit and a speaker gain control unit. A main display unit 806 provides a display to the plurality of frames. The display 806 includes display circuitry configured to display at least a portion of a user interface of the mobile terminal 800 (e.g., mobile telephone). Additionally, the display 806 and display circuitry are configured to facilitate user control of at least some functions of the mobile terminal 800. An audio function circuitry 808 includes a microphone 810 and microphone amplifier that amplifies the speech signal output from the microphone 810. The amplified speech signal output from the microphone 810 is fed to a coder/decoder (CODEC) 812.

A radio section 814 amplifies power and converts frequency in order to communicate with a base station, which is included in a mobile communication system, via antenna 816. The power amplifier (PA) 818 and the transmitter/modulation circuitry are operationally responsive to the MCU 802, with an output from the PA 818 coupled to the duplexer 820 or circulator or antenna switch, as known in the art. The PA 818 also couples to a battery interface and power control unit 819.

In use, a user of the mobile terminal 800 speaks into the microphone 810 and his or her voice along with any detected background noise is converted into an analog voltage. The analog voltage is then converted into a digital signal through the Analog to Digital Converter (ADC) 822. The control unit 802 routes the digital signal into the DSP 804 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 824 for compensation of any frequency-dependent impairments that occur during transmission though the air such as phase and amplitude distortion. After equalizing the bit stream, the modulator 826 combines the signal with a RF signal generated in an RF interface 828. The modulator 826 generates a sine wave by way of frequency or phase modulation. In order to prepare the signal for transmission, an up-converter 830 combines the sine wave output from the modulator 826 with another sine wave generated by a synthesizer 832 to achieve the desired frequency of transmission. The signal is then sent through a PA 818 to increase the signal to an appropriate power level. In practical systems, the PA 818 acts as a variable gain amplifier whose gain is controlled by the DSP 804 from information received from a network base station. The signal is then filtered within the duplexer 820 and optionally sent to an antenna coupler 834 to match impedances to provide maximum power transfer. Finally, the signal is transmitted via antenna 816 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 800 are received via antenna 816 and immediately amplified by a low noise amplifier (LNA) 836. A down-converter 838 lowers the carrier frequency while the demodulator 840 strips away the RF leaving only a digital bit stream. The signal then goes through the equalizer 824 and is processed by the DSP 804. A Digital to Analog Converter (DAC) 842 converts the signal and the resulting output is transmitted to the user through the speaker 844, all under control of a Main Control Unit (MCU) 802—which can be implemented as a Central Processing Unit (CPU) (not shown).

The MCU 802 receives various signals including input signals from the keyboard 846. The keyboard 846 and/or the MCU 802 in combination with other user input components (e.g., the microphone 810) comprise a user interface circuitry for managing user input. The MCU 802 runs a user interface software to facilitate user control of at least some functions of the mobile terminal 800 to navigate to access digital images and display the set of image elements based on the pattern of navigation. The MCU 802 also delivers a display command and a switch command to the display 807 and to the speech output switching controller, respectively. Further, the MCU 802 exchanges information with the DSP 804 and can access an optionally incorporated SIM card 848 and a memory 850. In addition, the MCU 802 executes various control functions required of the terminal. The DSP 804 may, depending upon the implementation, perform any of a variety of conventional digital processing functions on the voice signals. Additionally, DSP 804 determines the background noise level of the local environment from the signals detected by microphone 810 and sets the gain of microphone 810 to a level selected to compensate for the natural tendency of the user of the mobile terminal 800.

The CODEC 812 includes the ADC 822 and DAC 842. The memory 850 stores various data including call incoming tone data and is capable of storing other data including music data received via, e.g., the global Internet. The software module could reside in RAM memory, flash memory, registers, or any other form of writable storage medium known in the art. The memory 850 may be, but not limited to, a single memory, CD, DVD, ROM, RAM, EEPROM, optical storage, or any other non-volatile storage medium capable of storing digital data.

An optionally incorporated SIM card 848 carries, for instance, important information, such as the cellular phone number, the carrier supplying service, subscription details, and security information. The SIM card 848 serves primarily to identify the mobile terminal 800 on a radio network. The card 848 also contains a memory for storing a personal telephone number registry, text messages, and user specific mobile terminal settings.

Figure 9:
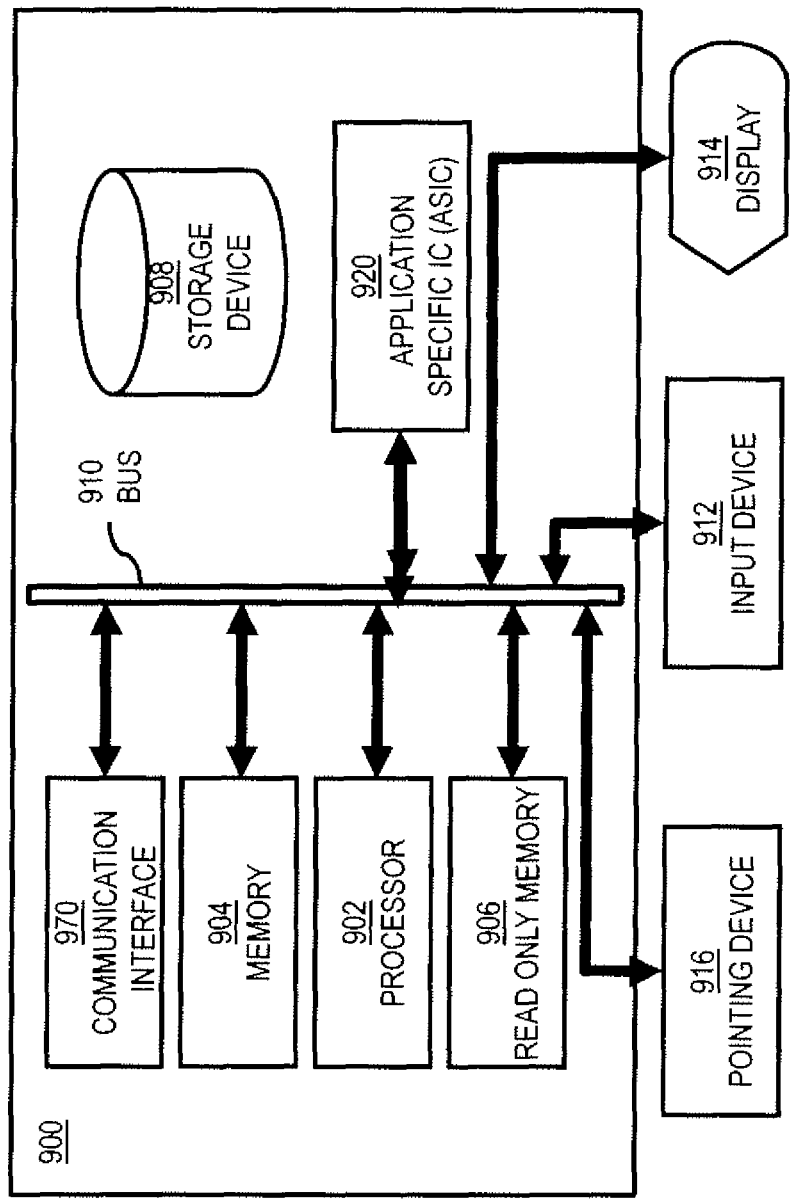
FIG. 9 is a diagram of computer system, in accordance with an embodiment.

FIG. 9 illustrates a diagram of a computer system 900, in accordance with an embodiment. The computer system 900 may be an example of the apparatus 700, or means for tracking of face portion in plurality of frames as described above, according to one embodiment. Further, the methods described herein such as the methods 200, 500 and other variations thereof can be implemented in the computer system 900. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to detect a face portion in a frame of a plurality of frames in a multimedia content of a device, track the face portion and perform color-tracking on losing a track of the face portion for re-tracking the face portion, as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for detecting a presence of a face portion in a frame of a plurality of frames in the multimedia content, tracking the face portion in at least one subsequent frame of the frame and performing a color-tracking of the face portion on losing a track of the face portion in the at least one subsequent frame.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to caching a set of image elements in response to an image accessing application, detecting a pattern of navigation of the user input, and updating the set of image elements based on the pattern of navigation. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for detecting a face portion in a frame of a plurality of frames in a multimedia content, tracking the face portion in at least one subsequent frame of the frame, and performing a color-tracking of the face portion on losing a track of the face portion in the at least one subsequent frame. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for tracking of the face portion may be provided to the bus 910 for use by the processor from an external input device 912, such as a touch screen, keyboard containing alphanumeric keys operated by a human user, PS2 mouse or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communications interface 970 provides a one-way or two-way communication coupling to a variety of external devices that operate with their own processors, such as printers, scanners and external disks. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. In an embodiment, the storage device 908 may be utilized to store digital images. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

At least some embodiments of the disclosure are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908. Execution of the sequences of instructions contained in memory 904 causes processor 902 to perform one or more of the method steps described herein. In alternative embodiments, hardware, such as ASIC 920, may be used in place of or in combination with software to implement some embodiments of the disclosure. Thus, embodiments of the disclosure are not limited to any specific combination of hardware and software, unless otherwise explicitly stated herein.

Based on the foregoing, methods, apparatuses and computer program products are provided for face portion tracking in the plurality of frames. Various embodiments of the present disclosure are provided for detecting and subsequently tracking a face portion. Detection of the face portion is performed based on a pattern recognition which is conventionally complex and computationally intensive. However, various embodiments of the present disclosure are provided for reducing a number of computations during the detection of the face portion. For example, shifting of a starting point of a detection window in successive frames and using a large step size for detecting the face portion reduces a number of computations. Another example may be performing the detection of the face portion by dividing a number of scales across the plurality of frames for reducing computational complexity. Further, evaluation of a set of pixels across a first layer of classification function for computing a face portion's angle of orientation and performing evaluation by all layers of classification functions for the face portion's angle of orientation also reduces a number of computations during detection of the face portion.

Further, various embodiments of the present disclosure are provided for tracking a face portion in a robust manner, implying that no face portion is missed during the tracking operation. The color-tracking may be performed to preclude missing of a face portion in the tracking operation. As a result, the computationally intensive and complex operation of detecting the face portion may not be needed to be re-performed in its entirety for regaining a track of the lost face portion. Further, a number of computations during the tracking operation are also reduced by performing operations, such as tracking the face portion in a region of interest. Thus, a real time performance of image processing is vastly improved as no face portions are missed and face portion tracking is performed in a robust manner and with less number of computations and reduced complexity.

The foregoing descriptions of specific embodiments of the present disclosure have been presented for purposes of illustration and description. They are not intended to be exhaustive or to limit the present disclosure to the precise forms disclosed, and obviously many modifications and variations are possible in light of the above teaching. The embodiments were chosen and described in order to best explain the principles of the present disclosure and its practical application, to thereby enable others skilled in the art to best utilize the present disclosure and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present disclosure.

The invention claimed is:

1. A method comprising:
using a processor to perform the steps of
detecting a face portion in a frame of a plurality of frames of a multimedia content, wherein detecting the face portion in the frame comprises:
providing a detection window configured to overlay onto a set of pixels in the frame;
evaluating the set of pixels bounded by the detection window based on at least one layer of classification functions for detecting the face portion in the set of pixels, wherein evaluating the set of pixels bounded by the detection window comprises: evaluating the set of pixels based on a first layer of classification function of the at least one layer of classification functions, the evaluation configured to be performed for one or more angles of orientation and further configured to compute a classification score for at least one of the one or more angles of orientation; selecting an angle with a maximum score of computed classification scores as an angle of orientation of the face portion; and detecting the face portion in the set of pixels by performing evaluation of the set of pixels based on the at least one layer of classification function, the evaluation configured to be performed for the angle of orientation of the face portion;
traversing the detection window by a first step size onto a neighboring set of pixels of the set of pixels; and
evaluating the neighboring set of pixels based on the at least one layer of classification functions for detecting the face portion in the neighboring set of pixels;
tracking the face portion in at least one subsequent frame of the frame; and
performing a color-tracking of the face portion on losing a track of the face portion in the at least one subsequent frame, where the color-tracking is performed for re-tracking the face portion in the at least one subsequent frame.

2. The method of claim 1 further comprising shifting a starting point of the detection window by a pre-defined size in successive frames of the plurality of frames for detecting the face portion.

3. The method of claim 1, wherein the detection of the face portion is performed in the frame for one or more scales of a plurality of scales and a number of scales of the plurality of scales over which the detection of the face portion is performed is divided across the plurality of frames, the plurality of scales representing a plurality of sizes of the face portion.

4. The method of claim 1, wherein the color-tracking comprises:
computing a horizontal luminance projection, a vertical luminance projection and a color histogram for test detections window of a plurality of test detection windows in a region of interest in a subsequent frame of the at least one subsequent frame, the region of interest corresponding to a region in the frame in which the face portion is detected;

computing a luminance projection distance for the test detection windows based on the horizontal luminance projection and the vertical luminance projection for the test detection windows and a reference horizontal luminance projection and a reference vertical luminance projection;

computing a color histogram distance for the test detection window based on the color histogram for the test detection windows and a reference color histogram; and determining a presence of the face portion in the region of interest based on the luminance projection distance and the color histogram distance for the test detection windows.

5. The method of claim 4, wherein the luminance projection distance is
computed for the detection windows based on a difference between the reference horizontal luminance projection and the computed horizontal luminance projection for the test detection windows, and a difference between the reference vertical luminance projection and the computed vertical luminance projection for the test detection windows.

6. An apparatus comprising:
at least one processor; and
at least one memory comprising computer program code, the at least one memory and
the computer program code configured to, with the at least one processor, cause the apparatus
at least to:
detect a face portion in a frame of a plurality of frames of a multimedia content;
track the face portion in at least one subsequent frame of the frame; and
perform a color-tracking of the face portion on losing a track of the face portion in the at least one subsequent frame, wherein the color-tracking is performed for re-tracking the face portion in the at least one subsequent frame;
wherein the apparatus is further caused, at least in part, to detect the face portion in the frame by:
providing a detection window configured to overlay onto a set of pixels in the frame;
evaluating the set of pixels bounded by the detection window based on at least one layer of classification function for detecting the face portion in the set of pixels;
traversing the detection window by a first step size onto a neighboring set of pixels of the set of pixels; and
evaluating the neighboring set of pixels based on the at least one layer of classification function for detecting the face portion in the neighboring set of pixels, and
wherein the apparatus is further caused, at least in part, to evaluate the set of pixels bounded by the detection window by:
evaluating the set of pixels based on a first layer of classification function of the at least one layer of classification function, the evaluation configured to be performed for one or more angles of orientation and further configured to compute a classification score for at least one of the one or more angles of orientation;
selecting an angle with a maximum score of computed classification scores as an angle of orientation of the face portion; and
detecting the face portion in the set of pixels by performing evaluation of the set of pixels based on the at least one layer of classification function, the evaluation configured to be performed for the angle of orientation of the face portion.

7. The apparatus of claim 6, wherein the apparatus is further caused, at least in part, to shift a starting point of the detection window by a pre-defined size in successive frames of the plurality of frames for detecting the face portion.

8. The apparatus of claim 6, wherein the apparatus is further caused, at least in part, to configure detecting of the face portion to be performed in the frame for one or more scales of a plurality of scales and a number of scales of the plurality of scales over which the detection of the face portion is performed is divided across the plurality of frames, the plurality of scales representing a plurality of sizes of the face portion.

9. The apparatus of claim 6, wherein the apparatus is further caused, at least in part, to perform the color-tracking by:
computing a horizontal luminance projection, a vertical luminance projection and a color histogram for test detection windows of a plurality of test detection windows in a region of interest in a subsequent frame of the at least one subsequent frame, the region of interest corresponding to a region in the frame in which the face portion is detected;
computing a luminance projection distance for the test detection windows based on the horizontal luminance projection and the vertical luminance projection for the test detection windows and a reference horizontal luminance projection and a reference vertical luminance projection;
computing a color histogram distance based on the color histogram for the test detection windows and a reference color histogram; and
determining a presence of the face portion in the region of interest based on the luminance projection distance and the color histogram distance for the test detection windows.

10. The apparatus of claim 9, wherein the apparatus is further caused, at least
in part, to compute the luminance projection distance for the test detection windows based on a difference between the reference horizontal luminance projection and the computed horizontal luminance projection for the test detection windows, and a difference between the reference vertical luminance projection and the computed vertical luminance projection for the test detection windows.

11. A computer program product comprising a non-transitory computer-readable storage medium, the computer-readable storage medium comprising a set of instructions, which, when executed by one or more processors, cause an apparatus to at least perform:
detect a face portion in a frame of a plurality of frames of a multimedia content;
track the face portion in at least one subsequent frame of the frame; and
perform a color-tracking of the face portion on losing a track of the face portion in the at least one subsequent frame, wherein the color-tracking is performed for re-tracking the face portion in the at least one subsequent frame, wherein the apparatus is further caused, at least in part, to detect the face portion in the frame by:
providing a detection window configured to overlay onto a set of pixels in the frame;
evaluating the set of pixels bounded by the detection window based on at least one layer of classification functions for detecting the face portion in the set of pixels;

traversing the detection window by a first step size onto a neighboring set of pixels of the set of pixels; and evaluating the neighboring set of pixels based on the at least one layer of classification function for detecting the face portion in the neighboring set of pixels, and wherein the apparatus is further caused, at least in part, to evaluate the set of pixels bounded by the detection window based on one or more layers of classification functions by:

evaluating the set of pixels based on a first layer of classification function of the at least one layer of classification function, the evaluation configured to be performed for one or more angles of orientation and further configured to compute a classification score for at least one of the one or more angles of orientation;

selecting an angle with a maximum score of computed classification scores as an angle of orientation of the face portion; and detecting the face portion in the set of pixels by performing evaluation of the set of pixels based on the at least one layer of classification function, the evaluation configured to be performed for the angle of orientation of the face portion.

12. The computer program product of claim 11, wherein the apparatus is further caused, at least in part, to shift a starting point of the detection window by a pre-defined size in successive frames of the plurality of frames for detecting the face portion.

13. The computer program product of claim 11, wherein the apparatus is further caused, at least in part, to configure detecting of the face portion to be performed in the frame for one or more scales of a plurality of scales and a number of scales of the plurality of scales over which the detection of the face portion is performed is divided across the plurality of frames, the plurality of scales representing a plurality of sizes of the face portion.

14. The computer program product of claim 11, wherein the apparatus is further caused, at least in part to perform the color-tracking by:

computing a horizontal luminance projection, a vertical luminance projection and a color histogram for test detection windows of a plurality of test detection windows in a region of interest in a subsequent frame of the at least one subsequent frame, the region of interest corresponding to a region in the frame in which the face portion is detected;

computing a luminance projection distance for the test detection windows based on the horizontal luminance projection and the vertical luminance projection for the test detection windows and a reference horizontal luminance projection and a reference vertical luminance projection;

computing a color histogram distance for the detection windows based on the color histogram for the test detection window and a reference color histogram; and determining a presence of the face portion in the region of interest based on the luminance projection distance and the color histogram distance for the test detection windows.

\* \* \* \* \*